(12) United States Patent
Roy et al.

(10) Patent No.: US 12,531,933 B2
(45) Date of Patent: Jan. 20, 2026

(54) EDGE APPLICATION SERVER RELOCATION

(71) Applicant: INTERDIGITAL PATENT HOLDINGS, INC., Wilmington, DE (US)

(72) Inventors: Michel Roy, Candiac (CA); Ulises Olvera-Hernandez, Saint-Lazare (CA); Robert Gazda, Spring City, PA (US); Debashish Purkayastha, Collegeville, PA (US); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/020,279

(22) PCT Filed: Aug. 12, 2021

(86) PCT No.: PCT/US2021/045753
§ 371 (c)(1),
(2) Date: Feb. 8, 2023

(87) PCT Pub. No.: WO2022/036102
PCT Pub. Date: Feb. 17, 2022

(65) Prior Publication Data
US 2023/0269300 A1     Aug. 24, 2023

Related U.S. Application Data

(60) Provisional application No. 63/064,701, filed on Aug. 12, 2020.

(51) Int. Cl.
G06F 15/16     (2006.01)
H04L 67/148    (2022.01)
H04W 36/12     (2009.01)

(52) U.S. Cl.
CPC ........ H04L 67/148 (2013.01); H04W 36/125 (2018.08)

(58) Field of Classification Search
CPC ................ H04L 67/148; H04L 67/14; H04L 65/1066; H04L 67/55; H04L 67/51
(Continued)

(56) References Cited

U.S. PATENT DOCUMENTS

2015/0341467 A1* 11/2015 Lim .................. H04L 69/16
                                                709/203
2018/0192471 A1*  7/2018 Li .................... H04W 4/50
(Continued)

FOREIGN PATENT DOCUMENTS

WO     2023/086761     5/2023

OTHER PUBLICATIONS

Convida Wireless LLC et al., "Solutions 20, 21 clean-up and conclusion to Key Issue#9 Preserving Service Continuity," 3GPP TSG-SA WG6 Meeting #34, S6-192340, Reno, Nevada (Nov. 11-15, 2019).
(Continued)

*Primary Examiner* — Kaylee J Huang
(74) *Attorney, Agent, or Firm* — Volpe Koenig

(57) ABSTRACT

Methods and apparatuses for reducing application instantiation delay and downtime are described herein. A method may comprise relocating an application function from a source Edge Data Network (EDN) component to a target EDN component. The method may comprise receiving an indication, and/or determining, based on at least one of a user mobility, resource optimization requirement, key performance indicator (KPI), or a failed relocation attempt, to relocate the application function. The method may further comprise performing a Protocol Data Unit (PDU) session establishment procedure toward the target EDN component.

(Continued)

The method may further comprise determining, based on one or more received parameters for edge usage and capabilities, to relocate the application function. The method may further comprise sending, to a European Telecommunications Standards Institute (ETSI) Multi-access Edge Computing (MEC) orchestrator, an indication that the application function will be relocated. The application function may be a User Plane Function (UPF).

16 Claims, 20 Drawing Sheets

(58) Field of Classification Search
USPC .................................. 709/227, 229, 203, 217
See application file for complete search history.

(56) References Cited

U.S. PATENT DOCUMENTS

| | | | |
|---|---|---|---|
| 2019/0159157 A1* | 5/2019 | Gupta | H04W 36/0033 |
| 2019/0342814 A1* | 11/2019 | Imai | H04W 4/029 |
| 2021/0307018 A1* | 9/2021 | Qaisrani | H04W 48/16 |
| 2022/0124147 A1* | 4/2022 | Ge | H04L 67/563 |
| 2022/0183108 A1* | 6/2022 | Young | H04W 48/18 |
| 2022/0191090 A1* | 6/2022 | Lee | H04L 67/04 |
| 2022/0330128 A1* | 10/2022 | Kim | H04W 64/003 |
| 2022/0361054 A1* | 11/2022 | Youn | H04W 36/32 |
| 2023/0053805 A1* | 2/2023 | Kim | H04L 67/148 |
| 2023/0164234 A1* | 5/2023 | Ge | H04L 67/52 |
| | | | 709/206 |
| 2023/0209621 A1* | 6/2023 | Olvera-Hernandez | |
| | | | H04W 76/12 |
| | | | 370/329 |
| 2023/0239343 A1* | 7/2023 | Ge | H04L 67/1031 |
| | | | 709/203 |
| 2023/0262134 A1* | 8/2023 | Tangudu | H04L 67/125 |
| | | | 709/224 |
| 2023/0269794 A1* | 8/2023 | Li | H04W 76/12 |
| | | | 455/422.1 |
| 2023/0345311 A1* | 10/2023 | Mihály | H04W 36/12 |

OTHER PUBLICATIONS

ETSI, "Harmonizing Standards for Edge Computing—A Synergized Architecture Leveraging ETSI ISG MEC and 3GPP Specifications," ETSI White Paper #36 (Jul. 2020).
ETSI, "Multi-access Edge Computing (MEC) MEC 5G Integration," Draft ETSI GR MEC 031 V2.0.20 (Aug. 2020).
Huawei et al., "Trigger the EAS instantiation by EES," 3GPP TSG-SA WG6 Meeting #40-e, S6-202313, e-meeting (Nov. 16-24, 2020).
Interdigital et al., "Pseudo-CR on providing EEC with early notifications for context relocation," 3GPP TSG-SA WG6 Meeting #39-e, S6-201678, e-meeting (Aug. 31-Sep. 8, 2020).
Interdigital, "Pseudo-CR on providing EEC with early notifications for context relocation," 3GPP TSG-SA WG6 Meeting #39-e, S6-201394, e-meeting, (Aug. 31-Sep. 8, 2020).
Samsung et al., "Clarification on dynamic EAS instantiation triggering," 3GPP TSG-SA WG6 Meeting #41-e, S6-210232, e-meeting (Jan. 18-26, 2021).
Samsung et al., "Target EAS notification," 3GPP TSG-SA WG6 Meeting #41-e, S6-210347, e-meeting (Jan. 18-26, 2021).
Samsung et al., "Target EAS notification," 3GPP TSG-SA WG6 Meeting #41-e, S6-210287, e-meeting (Jan. 18-26, 2021).
Samsung, "Application context relocation," 3GPP TSG-SA WG6 Meeting #35 S6-200090, Hyderabad, India (Jan. 13-17, 2020).
Samsung, "Clarification on dynamic EAS instantiation triggering," 3GPP TSG-SA WG6 Meeting #41-e, S6-210055, e-meeting (Jan. 18-26, 2021).
Samsung, "Target EAS notification," 3GPP TSG-SA WG6 Meeting #40-e, S6-202170, e-meeting (Nov. 16-24, 2020).
Samsung, "Trigger the EAS instantiation by EES," 3GPP TSG-SA WG6 Meeting #40-e, S6-202288, e-meeting (Nov. 16-24, 2020).
Third Generation Partnership Project, "Technical Specification Group Services and System Aspects; System architecture for the 5G System (5GS); Stage 2 (Release 16)," 3GPP TS 23.501 V16.5.1 (Aug. 2020).
Third Generation Partnership Project, "Technical Specification Group Services and System Aspects; Procedures for the 5G System (5GS); Stage 2 (Release 16)," 3GPP TS 23.502 V16.5.1 (Aug. 2020).
Third Generation Partnership Project, "Technical Specification Group Core Network and Terminals; Enabling Edge Applications; Protocol specification; (Release 17)," 3GPP TS 24.558 V0.3.0 (Jun. 2021).
Third Generation Partnership Project, "Technical Specification Group Services and System Aspects; 5G System Enhancements for Edge Computing; Stage 2 (Release 17)," 3GPP TS 23.548 V1.0.0 (Jun. 2021).
Third Generation Partnership Project, "Technical Specification Group Services and System Aspects; Study on enhancement of support for Edge Computing in 5G Core network (5GC) (Release 17)," 3GPP TR 23.748 V17.0.0 (Dec. 2020).
Third Generation Partnership Project, "Technical Specification Group Services and System Aspects; Study on enhancement of support for Edge Computing in 5G Core network (5GC) (Release 17)," 3GPP TR 23.748 V0.4.0 (Jun. 2020).
Third Generation Partnership Project, "Technical Specification Group Services and System Aspects; Policy and charging control framework for the 5G System (5GS); Stage 2 (Release 17)," 3GPP TS 23.503 V17.1.0 (Jun. 2021).
Third Generation Partnership Project, "Technical Specification Group Services and System Aspects; Policy and charging control framework for the 5G System (5GS); Stage 2 (Release 16)," 3GPP TS 23.503 V16.9.0 (Jun. 2021).
Third Generation Partnership Project, "Technical Specification Group Services and System Aspects; Policy and charging control framework for the 5G System (5GS); Stage 2 (Release 16)," 3GPP TS 23.503 V16.5.1 (Aug. 2020).
Third Generation Partnership Project, "Technical Specification Group Services and System Aspects; System architecture for the 5G System (5GS); Stage 2 (Release 16)," 3GPP TS 23.501 V16.5.0 (Jul. 2020).
Third Generation Partnership Project, "Technical Specification Group Services and System Aspects; System architecture for the 5G System (5GS); Stage 2 (Release 17)," 3GPP TS 23.501 V17.1.1 (Jun. 2021).
Third Generation Partnership Project, "Technical Specification Group Services and System Aspects; Procedures for the 5G System (5GS); Stage 2 (Release 17)," 3GPP TS 23.502 V17.1.0 (Jun. 2021).
Third Generation Partnership Project, "Technical Specification Group Services and System Aspects; Architecture for enabling Edge Applications; (Release 17)," 3GPP TS 23.558 V0.4.0 (Aug. 2020).
Third Generation Partnership Project, "Technical Specification Group Services and System Aspects; Architecture for enabling Edge Applications; (Release 17)," 3GPP TS 23.558 V1.4.0 (Mar. 2021).
Third Generation Partnership Project, "Technical Specification Group Services and System Aspects; Architecture for enabling Edge Applications; (Release 17)," 3GPP TS 23.558 V17.0.0 (Jun. 2021).
Third Generation Partnership Project, "Technical Specification Group Services and System Aspects; Architecture for enabling Edge Applications; (Release 17)," 3GPP TS 23.558 V0.3.0 (Jun. 2020).
Third Generation Partnership Project, "Technical Specification Group Services and System Aspects; Procedures for the 5G System (5GS); Stage 2 (Release 16)," 3GPP TS 23.502 V16.5.0 (Jul. 2020).
Third Generation Partnership Project, "Technical Specification Group Services and System Aspects; Procedures for the 5G System (5GS); Stage 2 (Release 16)," 3GPP TS 23.502 V16.9.0 (Jun. 2021).
Third Generation Partnership Project, "Technical Specification Group Services and System Aspects; System architecture for the 5G System (5GS); Stage 2 (Release 16)," 3GPP TS 23.501 V16.9.0 (Jun. 2021).

* cited by examiner

EDGE APPLICATION SERVER RELOCATION

CROSS-REFERENCE TO RELATED APPLICATIONS

This application is the U.S. National Stage, under 35 U.S.C. § 371, of International Application No. PCT/US2021/045753 filed Aug. 12, 2021, which claims the benefit of U.S. Provisional Application No. 63/064,701, filed Aug. 12, 2020, the contents of which are incorporated herein by reference.

BACKGROUND

Edge computing may be a key enabler to 5G networking technology. By providing ultra-low network latency close to the user, edge computing may allow realization of new use cases that were not possible with cloud computing either because latency was too high or unpredictable or due to large amounts of data to move. One major obstacle that exists between edge and cloud computing is the relationship between network and computer. In cloud computing, the network may be independent from the computer. As a user moves physically, the mobile network may be reconfigured, but the user may continue to reach the same cloud resource after the re-configuration is complete. Similarly, computers can be reconfigured independently from the mobile network.

Edge computing, on the other hand, may distribute computing over the network and therefore make both network and computer operate interdependently. As a user moves physically, the mobile network may be reconfigured. In this case, the reconfiguration may account for computer availability as edge applications may be unavailable in future edge locations. Similarly, a computer may need to be reconfigured due to poor key performance indicators (KPIs); as such, reconfiguration of computers may necessitate influencing the network accordingly.

Edge application availability may be especially important when dealing with new edge-native use cases as these use cases often require resources available in limited quantities. Such resources may need to be allocated as needed (e.g. "Just-in-Time" or JiT) and only for the duration they are needed by the user. Some examples of limited resource applications might be in the case of computing via graphics processing units (CPUs), high-level computer processing units (CPUs), or storage of large datasets. Some examples of the related use cases are edge-gaming, real-time video analysis, complex IoT sensor mashup and artificial intelligence. As such, it may be important to provide robust coordination mechanisms between a network and a computer.

SUMMARY

Methods and apparatuses for reducing application instantiation delay and downtime are described herein. A method may comprise relocating an application function from a source Edge Data Network (EDN) component to a target EDN component. The method may comprise receiving an indication, and/or determining, based on at least one of a user mobility, resource optimization requirement, key performance indicator (KPI), or a failed relocation attempt, to relocate the application function. The method may further comprise performing a Protocol Data Unit (PDU) session establishment procedure toward the target EDN component. The method may further comprise determining, based on one or more received parameters for edge usage and capabilities, to relocate the application function. The method may further comprise sending, to a European Telecommunications Standards Institute (ETSI) Multi-access Edge Computing (MEC) orchestrator, an indication that the application function will be relocated. The application function may be a User Plane Function (UPF).

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
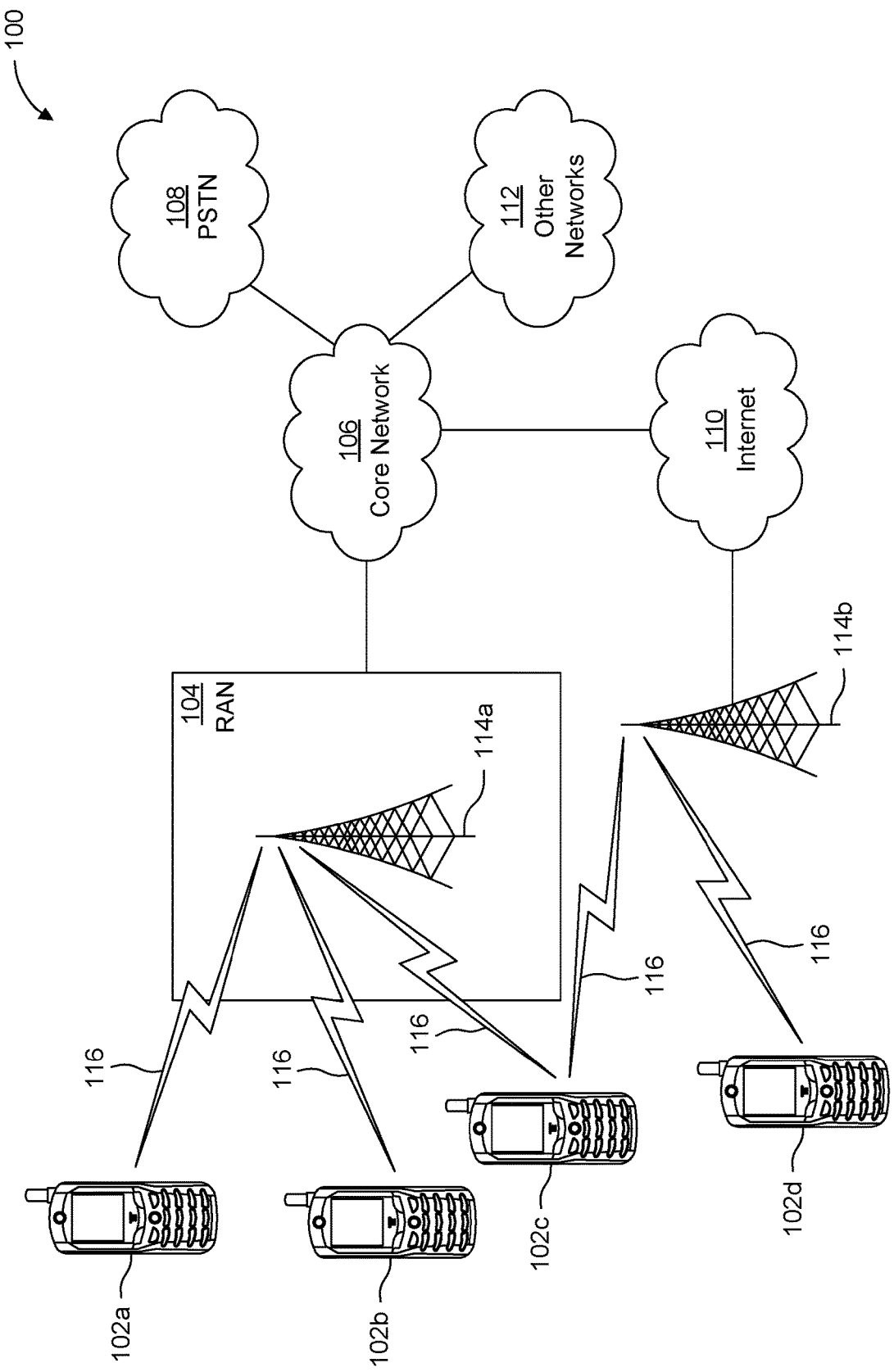
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
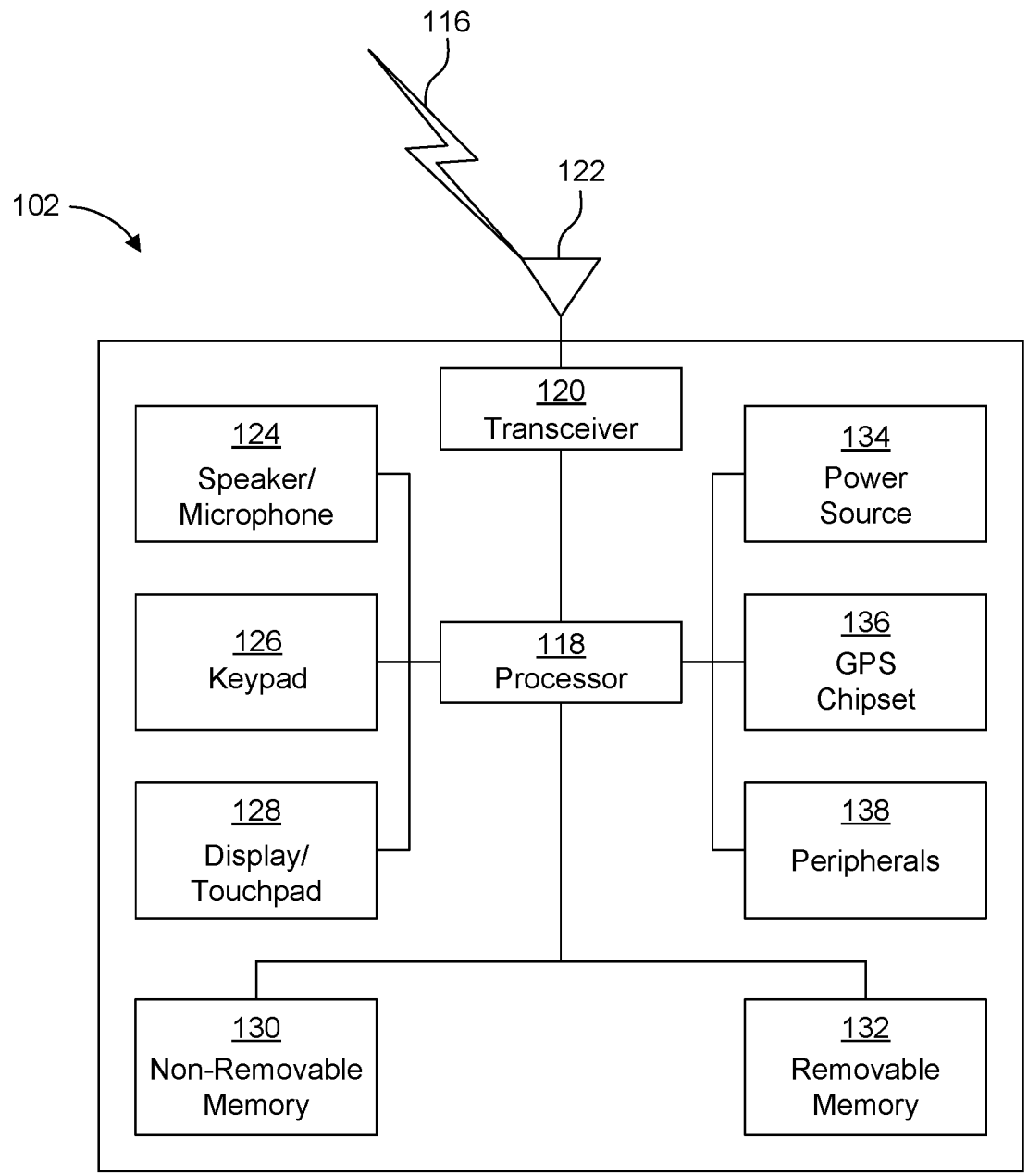
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
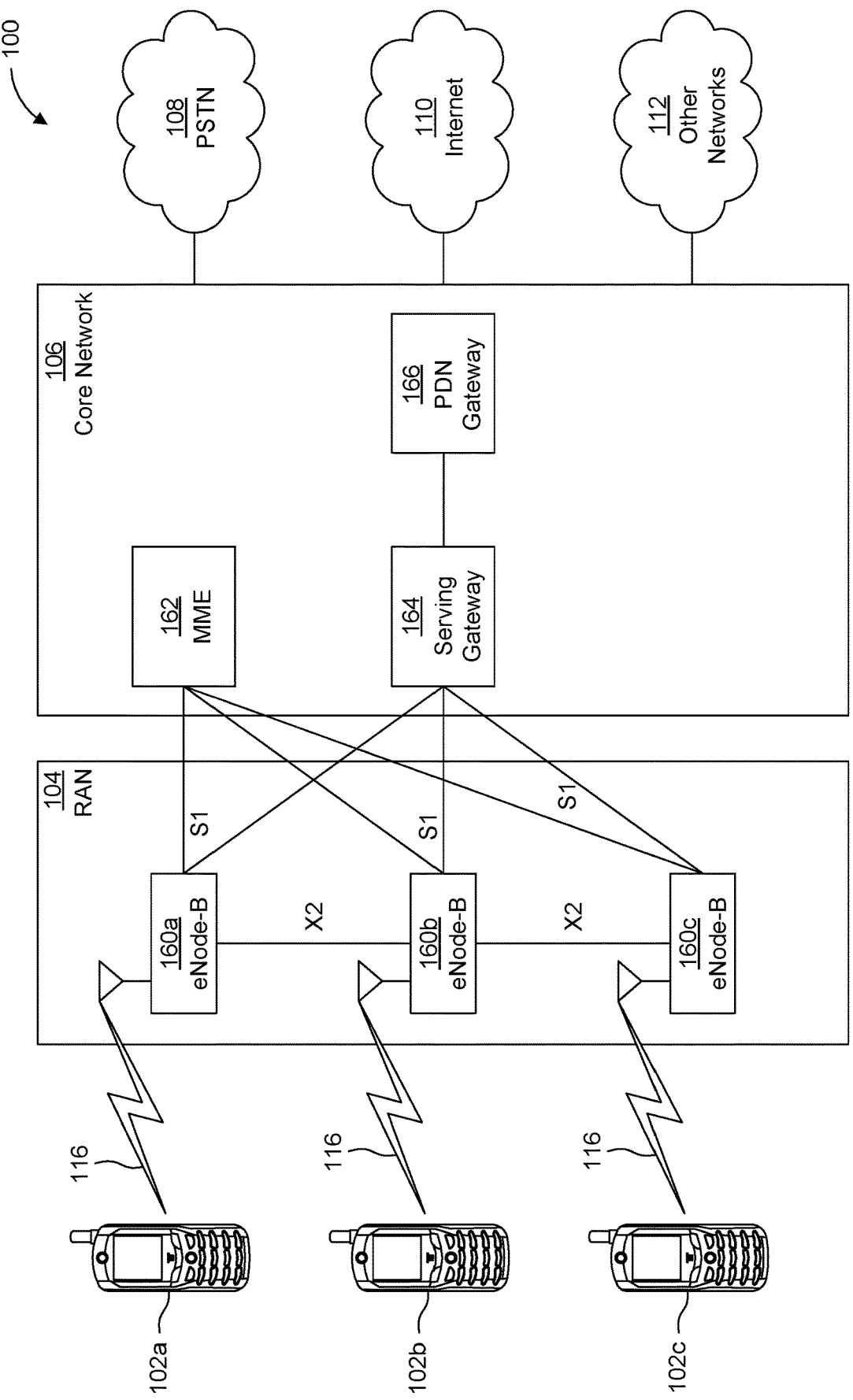
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
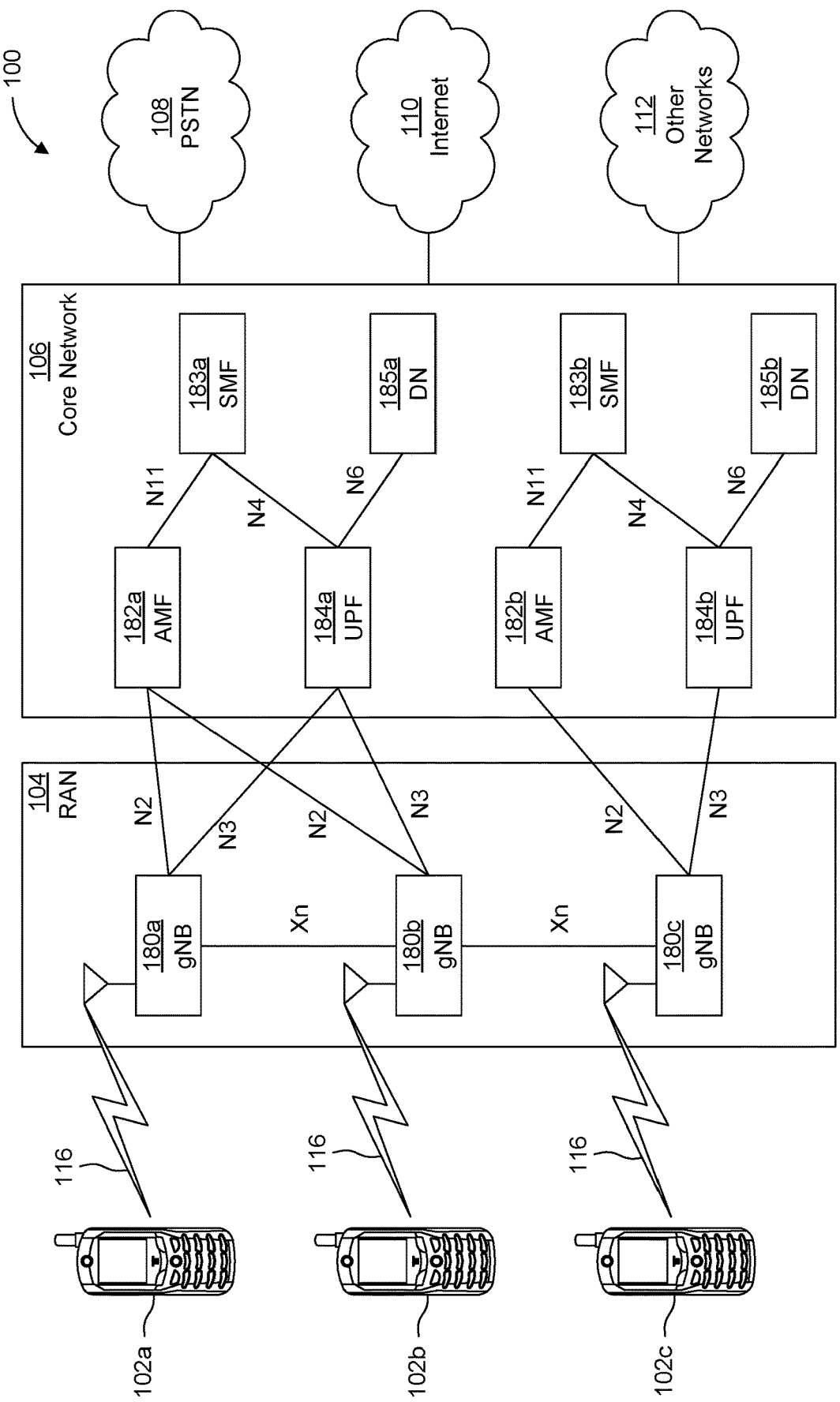
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106. The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
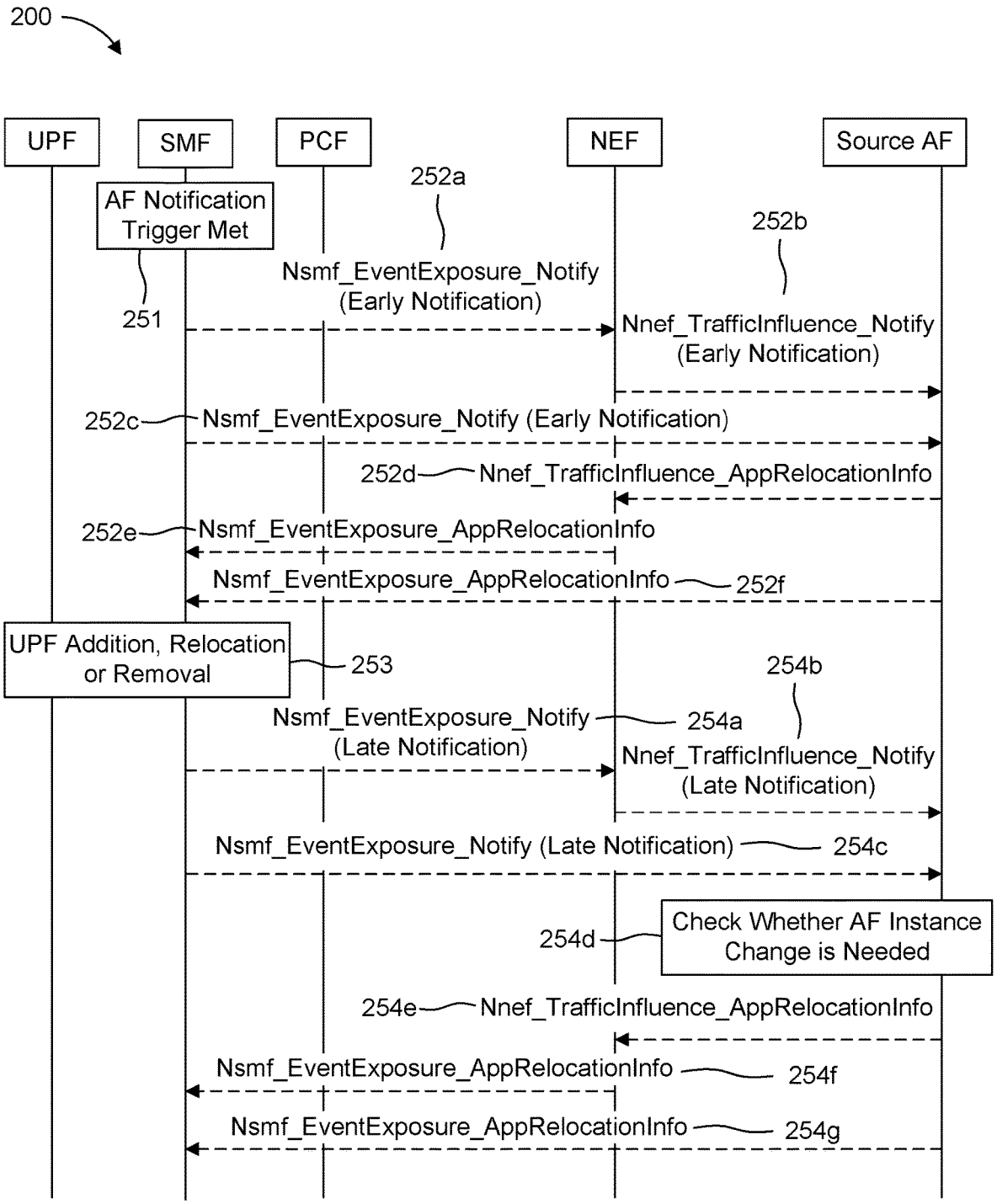
FIG. 2 is an example signaling flow diagram for notification of User Plane Management Events in an SA2 architecture.

FIG. 2 is an example signaling flow diagram for notification of User Plane Management Events 200 in an SA2 architecture. An AF (Application Function) may register for UP (User Plane) Management Notifications to stay informed of the UP changes. An Early Notification 252 may be issued to the Source AF once an AF notification trigger 251 is met. An early notification 252a may be issued from the SMF (Session Management Function) to the NEF (Network Exposure function), an early notification 252b may then be sent from the NEF to the Source AF. Alternatively, an Early Notification 252c. may be issued directly from the SMF to the Source AF.

Application relocation information will then be sent back from the Source AF to the SMF. Application Relocation Information 252d may be issued from the Source AF to the NEF, Application Relocation Information 252e may then be sent from the NEF to the SMF. Alternatively, Application Relocation Information 252f may be sent directly from the Source AF to the SMF. The Application Relocation Information may then trigger UPF (User Plane Function) addition, relocation, or removal.

After UPF addition, relocation, or removal a Late Notification may be issued to the Source AF. A Late Notification 254a may be issued from the SMF to the NEF, a Late Notification 254b may then be sent from the NEF to the Source AF. Alternatively a Late Notification 254c may be issued directly from the SMF to the Source AF. Once the Late Notification has been issued from the SMF to the Source AF, the system may check whether AF instance change is needed 254d.

Application relocation information may then be sent back from the Source AF to the SM. Application Relocation Information 254e may be issued from the Source AF to the NEF, Application Relocation Information 254f. may then be sent from the NEF to the SMF. Alternatively, Application Relocation Information 254 g may be sent to the SMF directly from the Source AF.

As described herein, notifications may be issued to the AF directly by the (session management function) SMF or alternatively via the network exposure function (NEF). To improve application relocation coordination, UP management events may provide an early and a late notification to application functions. These notifications may allow for pausing of the UP-management flow to allow application functions to perform certain tasks. A Edge Enabler Server and its associated Edge Application Server(s) may together represent an application function and may register to UP management events.

Figure 3:
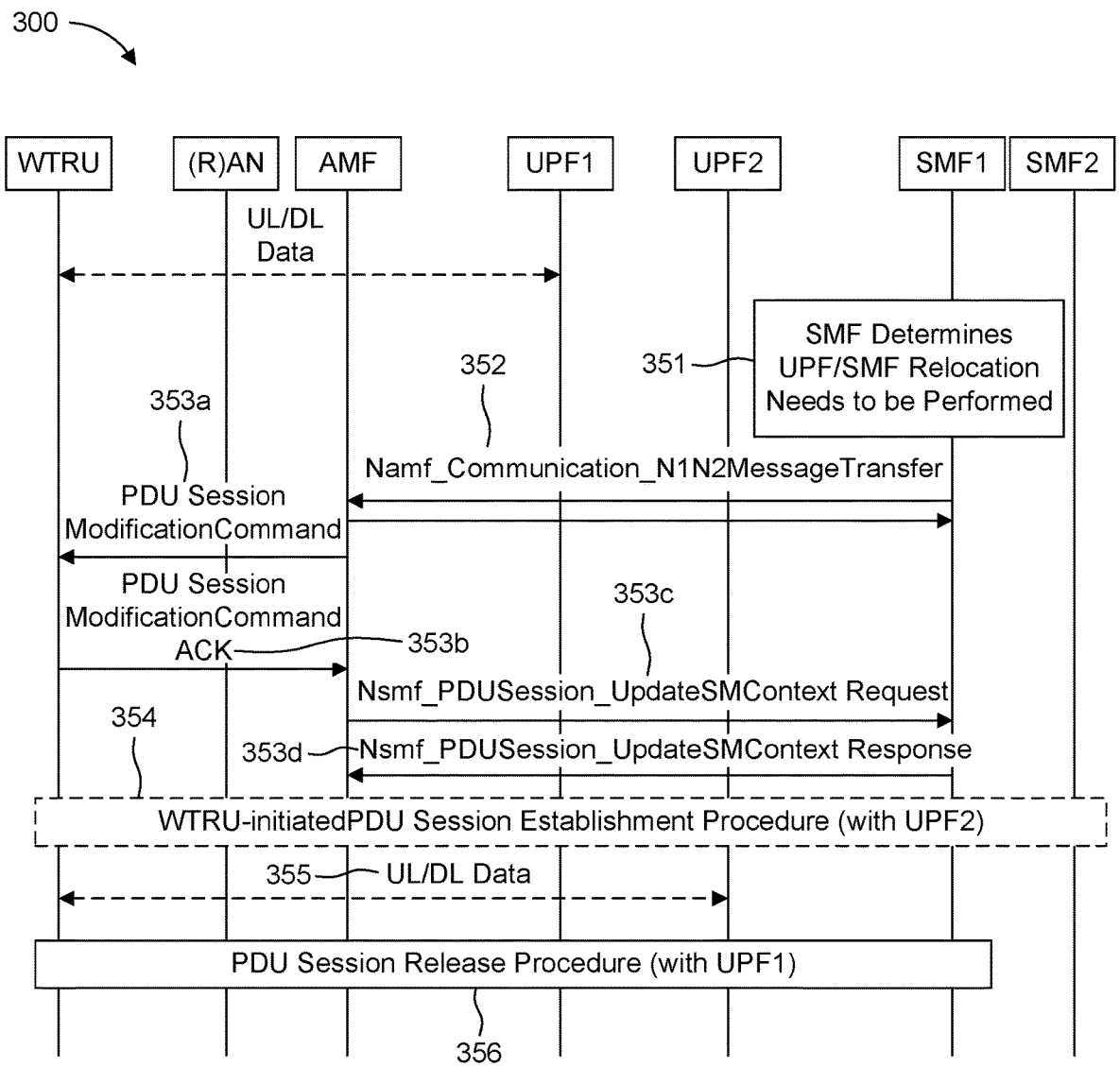
FIG. 3 is an example signaling flow diagram for a SSC mode 3 PDU session anchor change.

FIG. 3 illustrates an example flow for an SSC mode 3 PDU (Protocol Data Unit) session anchor change 300. In this scenario, an early notification (not shown in figure) may be sent by the SMF either directly or via the NEF before the new UP path is configured. The SMF1 may determine UPF/SMF relocation needs to be performed 351. An Namf_Communication_NIN2MessageTransfer 352 is then sent from the SMF1 to the AMF (Access and Mobility Management Function), then back to the SMF1. A PDU Session Modification Command 353a may then be sent from the AMF to the UE (User Equipment), a PDU Session Modification Command 353b may then be sent back to the AMF from the WTRU. An Nsmf_PDUSession_UpdateSMContext Request 353c may be sent from the AMF to the SMF1, and an Nsmf_PDUSession_UpdateSMContext Response 353d may be sent back to the AMF from the SMF1. After the Nsmf_PDUSession_UpdateSMContext Response 353a may be sent to the AMF, a UE-initiated PDU Session establishment procedure (with UPF2) 354 occurs. UL/DL Data 355 may be exchanged between the UPF2 and the UE. Finally, a PDU Session release procedure (with UPF1) 356 may be initiated.

In the scenario of FIG. 3, early notification (not shown on the figure) may be sent by the SMF either directly or via the NEF before the new UP path is configured (i.e., between 351 and 352, at the beginning of the UP-management procedure). If runtime coordination between AF and 5GC is enabled and the AF indicated that "AF acknowledgement is expected, the SMF may wait until the AF notification response is received.

Figure 4:
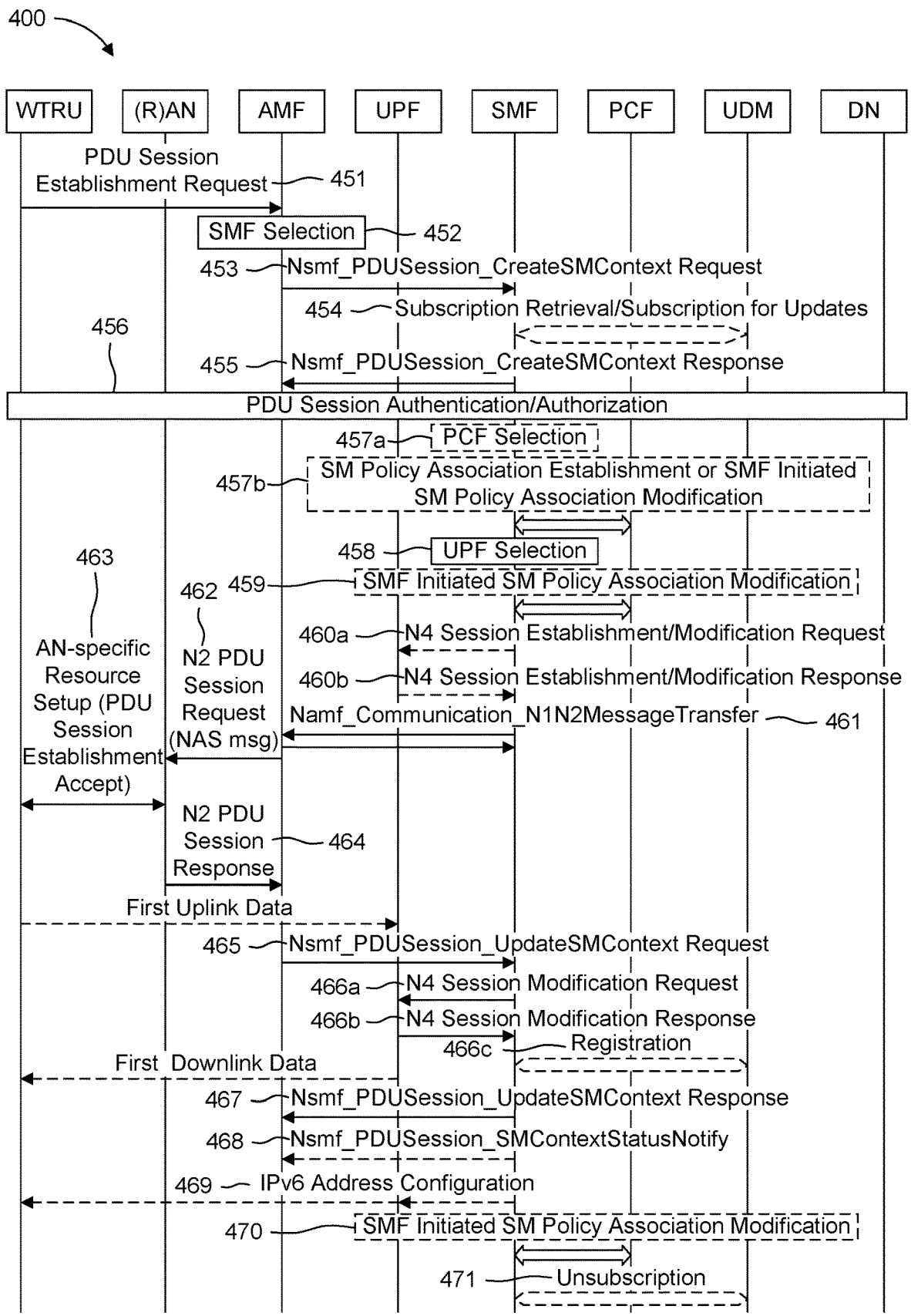
FIG. 4 is an example signaling flow diagram for PDU session establishment procedure.

FIG. 4 is an illustration of signaling flows for PDU session establishment procedure 400. A late notification (not shown in figure) may be sent by the SMG either directly or via the NEF, for example, once a new path has been configured. The signaling flow process starts by sending a PDU Session Establishment Request 451 from the WTRU to the AMF. After the Request 451 is received by the AMF, SMF selection 452 may be initiated. Next, an Nsmf_PDUSession_CreateSMContext Request 453 from the AMF to the SMF, where Subscription retrieval/Subscription for Updates 454 may be initiated. An Nsmf_PDUSession_CreateSMContext Response 455 may be sent back to the AMF from the SMF. After a Nsmf_PDUSession_CreateSMContext Response 455 is received by the AMF, a PDU Session authentication/authorization 456 may be initiated. This procedure may begin with the SMF initiating PCF selection 457a. The SMF and PCF may then engage in SM Policy Association Establishment or SMF initiated SM Policy Association Modification 457b. Next the SMF may initiate UPF selection 458, followed by the SMF and PCF engaging in SMF initiated SM Policy Association Modification 459.

An N4 Session Establishment/Modification Request 460a may then be sent from the SMF to the UPF, followed by an N4 Session Establishment/Modification Response 460b being sent from the UPF back to the SMF. The SMF may initiate a Message Transfer 461 (Namf_Communication_N1N2MessageTransfer) between the SMF and the AMF. An N2 PDU Session Request (NAS msg) 462 may then be sent from the AMF to the R(AN). This may initiate an AN-specific resource setup (PDU Session Establishment Accept) 463 between the R(AN) and the WTRU. The R(AN) may then send an N2 PDU Session Response 464 to the AMF. A First Uplink Data will then be sent from the WTRU to the UPF.

A Request (Nsmf_PDUSession_UpdateSMContext Request) 465 may then be sent from the AMF to the SMF. An N4 Session Modification Request 466a may then be sent from the SMF to the UPF, followed by an N4 Session Modification Response 466b being sent from the UPF back to the SMF. The PCF will then initiate Registration 466c of the N4 Session Modification Response 466b which may send a First Downlink Date from the UPF to the WTRU.

A Response (Nsmf_PDUSession_UpdateSMContext Response) 467 may be sent from the SMF to the AMF. A Notification (Nmsf_PDUSession_SMContextStatusNotify) 468 may be sent from the SMF to the AMF. An IPv6 Address 469 may then be sent from the SMF to the WTRU via the UPF. In some solutions an SMF initiated SM Policy Modification 470 may occur. This may initiate Unsubscription 471 by the PCF.

In the procedure above, it should be noted that if a runtime coordination between AF and 5GC is enabled and the AF indicated that "AF acknowledgement is expected, the SMF may wait until the AF notification response is received.

Figure 5:
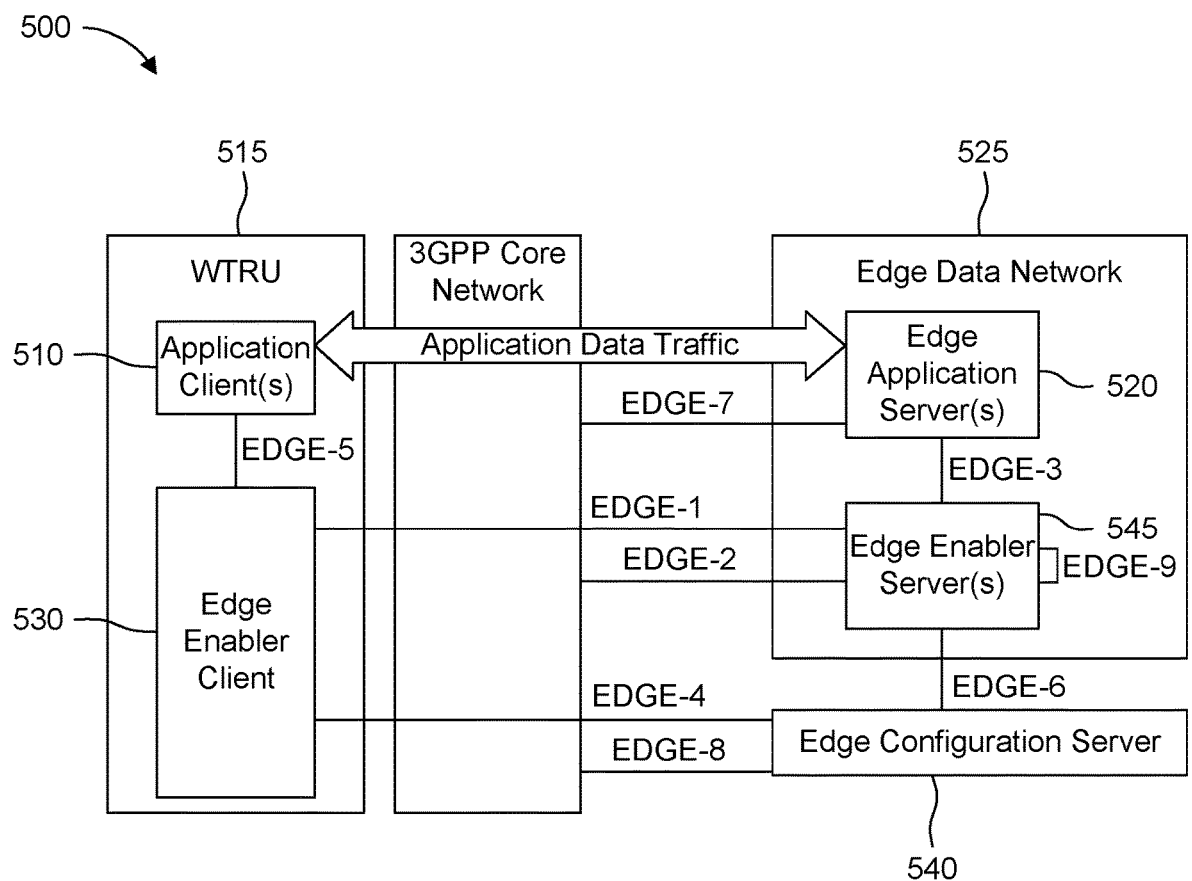
FIG. 5 is an example of an SA6 high-level architecture for enabling edge applications.

FIG. 5 shows an SA6 high-level architecture for enabling edge applications 500. The SA6 architecture may be provided for enabling edge applications. Various components that may be implemented in an SA6 Architecture are described herein. An architecture may include an Application Client (AC) 510, which may be user application residing on a WTRU 515. The AC 510 may be an application that communicates with an Edge Application Server (EAS) 520 in the Edge Data Network 525. In some embodiments, a WTRU 515 may use several ACs 510 concurrently. An architecture may include an Edge Enabler Client (EEC) 530, which may provide edge support to the ACs 510 on the WTRU 515. There may be one or more EECs 530 per WTRU. An architecture may include an Edge Configuration Server (ECS) 540, which may provide supporting functions needed for the EEC 530 to connect with an EAS 520. There may be one or more ECSs 540 for the network. An architecture may include an Edge Enabler Server (EES) 545, which may provide supporting functions needed for Edge Application Servers (EASs) 520 and/or Edge Enabler Clients (EECs) 530. In the context of a mobility/relocation use case, the Source-EES (S-EES) may be the EES used before mobility/relocation happens while the Target-EES (T-EES) may be the EES used after mobility/relocation has happened. In the context of a mobility/relocation use case, the Source-EES (S-EES) may be the EES used before mobility/relocation occurs. The Target-EES (T-EES) may be the EES used after mobility/relocation has happened. Depending on the embodiment, there may be a single EES per Edge Data Network (EDN) or Data Network Name, and/or there may be multiple EDNs in the network.

Mechanisms may be defined by SA2 and SA6 to support edge computing use cases. In some cases, these mechanisms may still rely on edge applications being universally available throughout the whole edge domain (e.g., "cloud-like" applications) and may not provide clear coordination mechanisms between the network and edge applications. While universal availability of edge applications may be possible, many edge use cases (e.g., edge gaming, real-time video processing, AI, IoT sensor mashup, etc.) may have low-latency requirements and may be unable to follow existing models. Reconfiguration in the mobile network is an operation that may require up to 50 ms. Instantiating a containerized application may take from 500 ms up to several seconds/minutes depending of the application complexity (e.g. spinning-up a complex application in a VM). Thus, long application instantiation times, if not properly coordinated with network reconfiguration, may cause service downtime for the user. Furthermore, as users move in the network, applications may need to be relocated. For stateful applications, time may be required to transfer the user context from the source to the target location. Additionally, context transfer may not be a single data transfer and may require several updates until connectivity is established. Thus, application state transfer may further unpredictably lengthen edge application readiness and may be unavoidable even if applications are pre-provisioned in target edge locations. Finally, 3GPP-SA6 may introduce an application framework that enables discovery and usage of edge applications by the mobile terminal.

This framework may also define APIs allowing communication with the 5G core network. It may be via these communication APIs that the application framework can discover specificities of the underlying network. For example, the application framework may be notified of core network changes or influence core network routing via existing APIs. Hence, some network reconfiguration decisions taking place at the Core Network and impacting Edge applications, may not be included in the set of APIs that support event notification subscription to Core Network events. Neither API may support AF Influence on Traffic. As a result, the Core Network may be unable to benefit from edge usage information for assisting in these decisions.

Accordingly, taught herein are procedures that allow EAS relocation & 5G network reconfiguration to happen seamlessly, preventing service downtime, when triggered at the network level or at the UE level or at the edge level. In addition, taught herein are solutions as to how a network reconfiguration mechanism may be updated to provide an improved network coordination with edge computing.

In some embodiments, architectures and procedures may ensure that just-in-time (JiT) edge-application instantiation or migration is successfully coordinated with the mobile network re-configuration when the re-configuration is triggered by the 5G Core network, or when it is triggered by the edge application framework. Such architectures or procedures may do so by, for example: defining a coordination procedure for 5GC reconfiguration and JiT EAS instantiation when network re-configuration is triggered at the 5GC; updating this procedure when re-configuration originates from the UE; when re-configuration originates from the EAS; by adding provisions to to improve 5GC reconfiguration via edge usage influence; or by providing a deployment using ETSI M3GPP-1 reference point for orchestration.

Solutions involving performing an EAS relocation procedure that may be triggered by an 5GC-SMF are described herein. Various aspects of the solution may be described, including: the overall procedure combining SA2/SA6/ETSI architectures; EES to ECS parameters for assistance in identifying T-EES; EES to EES interactions via EDGE-9 reference point; EES to EEC EES-Change-Notify and EAS-Change-Notify messages; EES to orchestration interactions; PDU Session Release timer value in Nnef-TrafficInfluence-AppRelocationInfo (early notification) response & resulting processing on the UE; PDU Session Release timer value in Nnef-TrafficInfluence-AppRelocationInfo (late notification) response, SMF extending the PDU release timer & resulting processing on the UE; new EES IEs (Information Elements) for caching instantiated EAS; and continuous context transfer.

Figure 6:
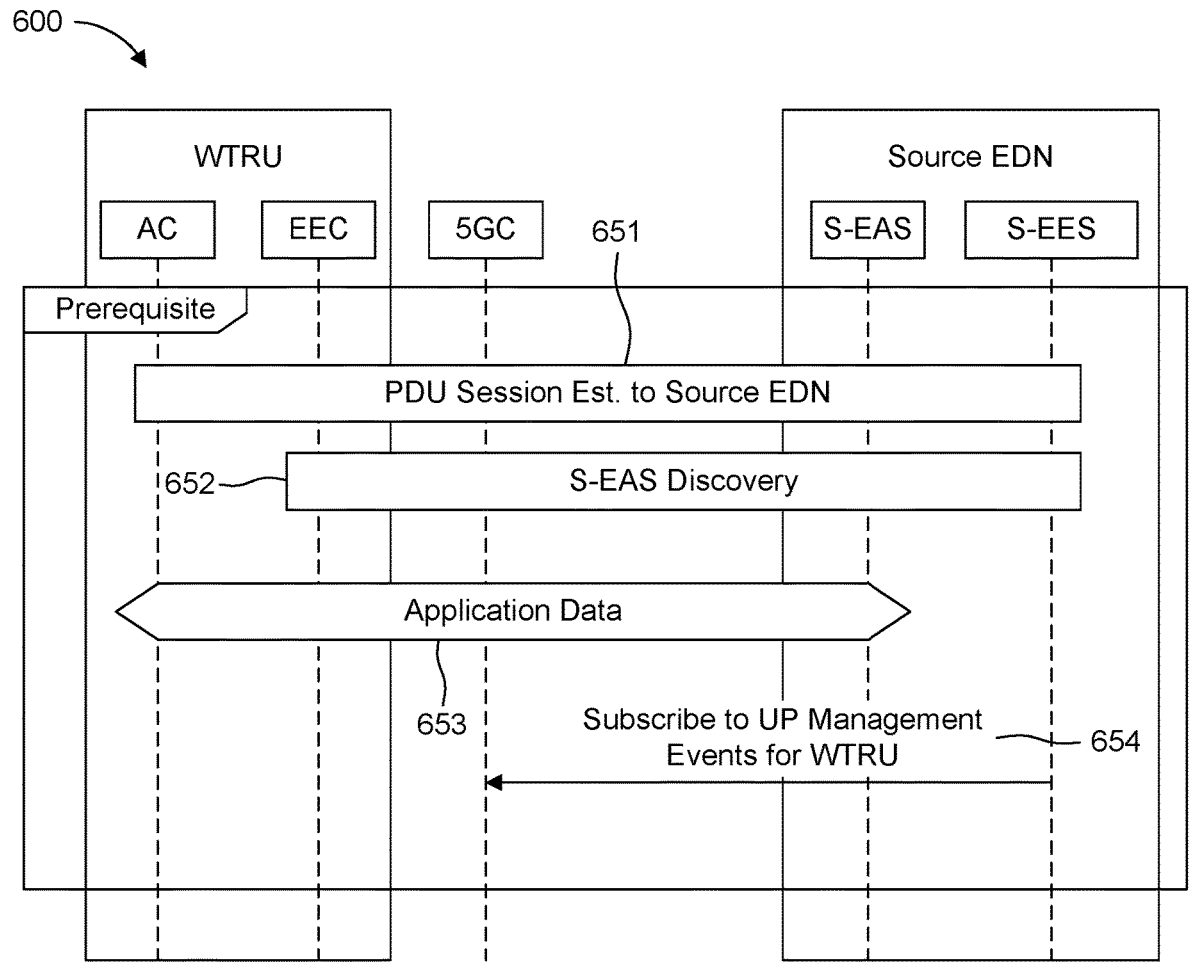
FIG. 6 illustrates a set of pre-requisites necessary for an EAS relocation procedure.

FIG. 6 illustrates a set of pre-requisites 600 necessary for performing an EAS relocation procedure. The prerequisites to the procedure may include one or more of the following steps and/or conditions. The WTRU may establish a PDU SSC mode 3 PDU session with the Source EDN 651. EDN selection may be provided by the PCF using URSP rules, or it may also be provisioned via other methods. The EEC may assist the AC in S-EAS discovery 652. Once the AC obtains the S-EAS endpoint address, it may use the address to start exchanging Application date with the S-EAS 653. An EES may expose a UP path management notifications to an EAS so the EES/EAS pair may act as an AF that can be notified of UP path management changes. As a result of a session establishment by the AC with the S-EAS, the S-EAS (via its S-EES) may Subscribe to UP management events for the WTRU 654.

Figure 7:
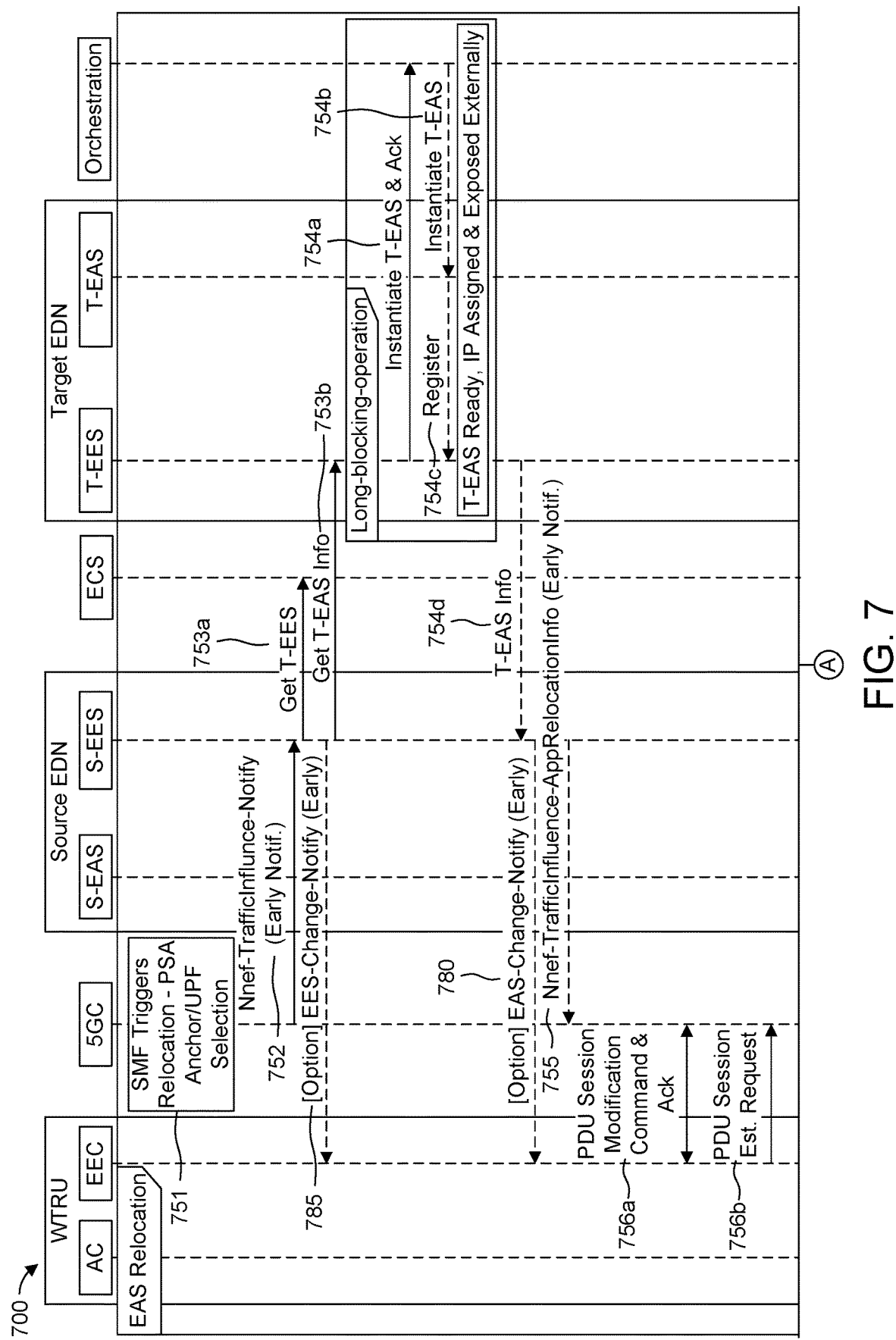
FIG. 7 illustrates an example procedure for EAS relocation triggered by an SMF.
Figure 7:
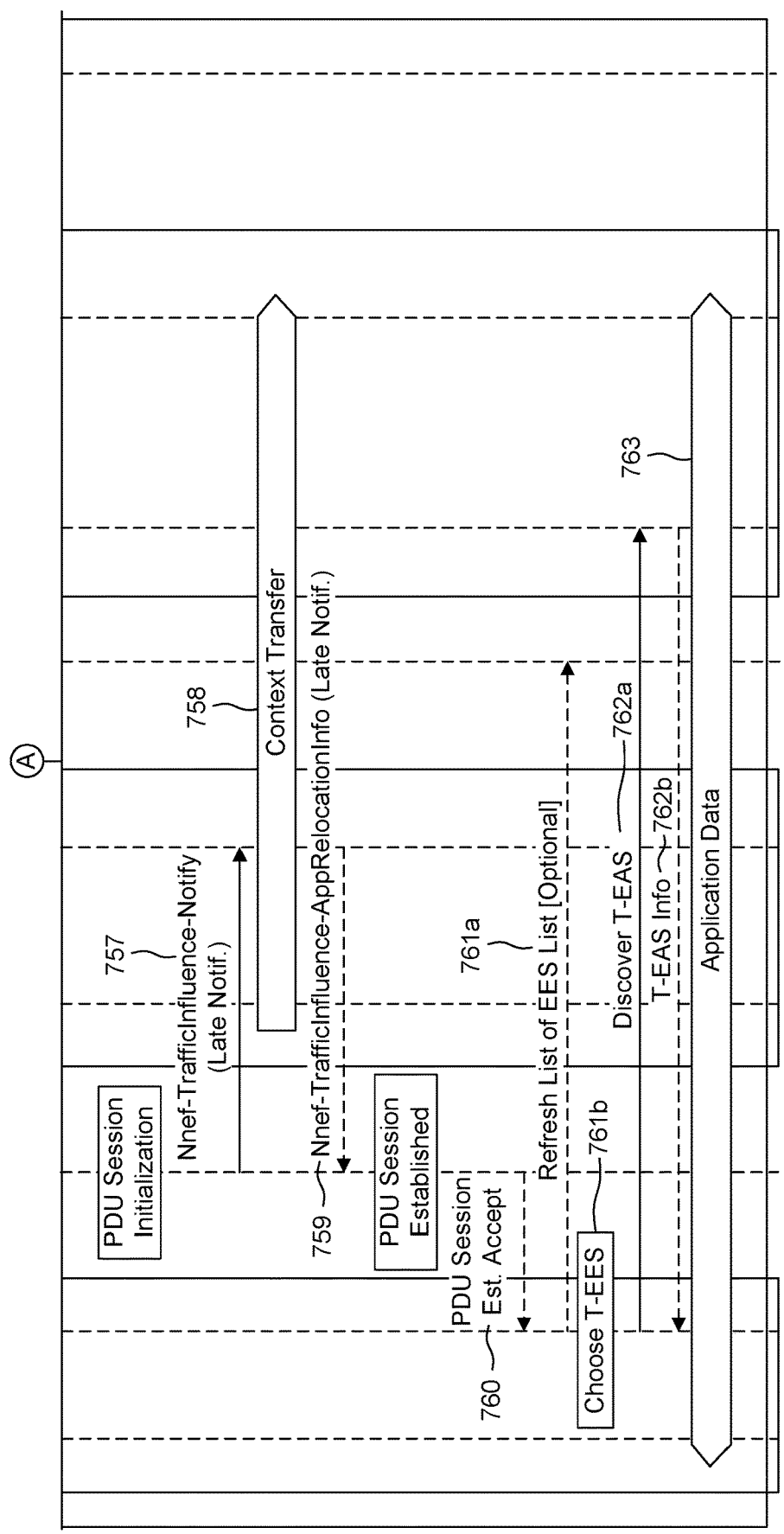

FIG. 7 presents an EAS relocation procedure 700 triggered by the SMF. The procedure 700 may begin when the SMF triggers relocation-PSA Anchor/UPF Selection 751.

The reason behind the relocation may be specific to the 5GC implementation but may be related, for instance, to mobility, optimization of network resource, or other factors. In some solutions, the decision of the SMF to request a new PDU session may impact edge computing operation. For example, it may require an existing edge application to be relocated to a new EDN. When such application is not already running in the Target EDN, coordination may be required between the edge and the 5GC.

The S-EES/S-EAS may have registered as an AF to the 5GC UP management notification for a given WTRU. As a result, the S-EES may receive an Early Notification (Nnef-TrafficInfluence-Notify) 752 indicating UP changes will occur. In some solutions, the EAS may have registered for UP notifications in the prerequisite phase. As a result, the S-EES may act as a central collection point for UP notifications. This may allow the S-EES to identify all impacted S-EAS(es_associated with a UE identifier as soon as a UP notification is received, thus allowing performance of batch transactions for multiple S-EASes simultaneously.

In some embodiments, upon reception of the Early Notification 752, the S-EES or alternatively, the S-EAS via the S-EES, may query the ECS to identify the T-EES 753*a* serving the new EDN. To assist the ECS in identifying the relevant T-EES 753*a*, the S-EES may include the current WTRU location and Information Elements received in the Early Notification 752. For example the list including the DNAI, UE identifier, spatial validity condition, N6 Traffic Routing, or other IEs may assist the ECS in identifying the T-EES 753*a*. Once the T-EES is known, the information that the S-EES is trying to discover is the endpoint address (e.g. IP address, port, URL, etc.) of one or more T-EAS that may be used after the network reconfiguration. Obtaining this information (1) validates that a specific T-EAS is available in the target EDN to serve the WTRU and (2) will allow to perform the S-EAS context transfer with the T-EAS. In some solutions, once the T-EES is known by the S-EES, the S-EES may issue a direct query to the T-EES 753*b* using the EDGE-9 reference point to obtain information about the T-EAS that will serve the WTRU after the UP reconfiguration is complete. The request sent to the T-EES may contain an EEC profile and the current WTRU location, and may also include information obtained from the Early Notification 752.

The S-EES may issue an EES-Change-Notify 780, 785 to the WRTU to provide early information. This early information may include an EES profile, and or information about the upcoming T-EES change. Providing this information to the WTRU may allow the EEC to query early information about the T-EES from the ECS or establish an early connection to the T-EES as soon as the new PDU context is active; this may also provide advantages to the EEC in preparing for the upcoming change or avoiding re-discovery of the T-EES and may improve T-EAS transition.

As an example, on reception of EES-Change-Notify 785 message, the WRTU may perform one or more of the following actions: use the T-EES information present in the EES-Change-Notify message 785 to establish connectivity to the T-EES; look up in its internal EES cache to find connectivity information to the T-EES; query an ECS using service provisioning procedures to discover connectivity information to the T-EES; establish a PDU session towards the T-EES data network; inform the Application Client located on the WRTU via EDGE-5 reference point or using other means to suspend communications with the S-EAS while the application context relocation is ongoing.

In some scenarios, there may be no T-EAS to serve the WTRU. However, if a T-EAS was available, interactions with the orchestrator may not be needed since they may have occurred in the past and the rest of the procedure applies. The T-EES may instantiate the T-EAS 754*a* by interacting with the orchestration layer or function in a network node. Depending on EAS complexity, EAS required hardware resources and the orchestration layer in general, the instantiation of the T-EAS 754*b* may take several seconds or even minutes before the T-EAS is ready to operate, has assigned an IP address, and has an externally reachable endpoint configured.

Once the T-EAS is ready and externally reachable, the T-EAS register to the T-EES 754*c* which may cache locally the T-EAS that has been instantiated 754*a* for that specific WTRU. It may be important that the T-EAS registration 754*c* contains a reference to the originating WTRU so that it is not consumed by another WTRU. Finally, the T-EAS endpoint address may be relayed back to the S-EES 754*d* which may provide the information to the S-EAS (not shown).

The S-EES may issue an EAS-Change-Notify to the WRTU providing early information such as an EAS profile and or information about the upcoming T-EAS change. This may provide advantages to the EEC in preparing for the upcoming change or avoiding re-discovery of the T-EAS and may improve T-EAS transition.

As an example, on reception of the EAS-Change-Notify message 780, the WRTU may perform one or more of the following actions: use the T-EAS information present in the EAS-Change-Notify message 780 to establish connectivity to the T-EES; look up in its internal EAS cache to find T-EAS connectivity information; query an ECS using service provisioning procedures to discover connectivity information to the T-EES; communicate with the T-EES to discover connectivity information to the T-EAS; establish a PDU session towards the T-EAS data network; inform the Application Client located on the WRTU via EDGE-5 reference point or using other means to suspend communications with the S-EAS while the application context relocation is ongoing or alternatively inform the Application Client that the T-EAS connectivity can be established if the context transfer has completed.

When available, the information included in EAS-Change-Notify 780 and EES-Change-Notify 785 may be combined in a single message.

In some solutions, the S-EES/S-EAS acting as an AF may have completed the instantiation of the T-EAS 754*b* and may send back a positive Early Notification (Nnefe-TrafficInfluence-AppRelocationInfo) 755 response to the 5GC so that network reconfiguration resumes. In the event where no T-EAS instantiation 754*b* can occur, a negative Early Notification 755 response may be sent back, which may possibly cancel the network reconfiguration. If the 5GC elects to proceed with the reconfiguration on a negative response, user service may be broken for the EAS that were not instantiated.

Alternatively or additionally, in the event where no T-EAS could be instantiated (not shown on in FIG. 7), the S-EES may decide to continue using the S-EAS and tell the 5GC to maintain the old connection longer. In this case, the Nnef-TrafficInfluence-AppRelocationInfo (early notification) response may include an indication of the requested period that the connection is needed for. This may trigger the SMF to modify the PDU Session Release timer values which are in turn delivered to the WTRU as PDU Session Address Lifetime in PCO. PDU Session Address Lifetime may be used to instruct the WTRU not to release the old PDU Session and may be used by the EEC to act towards the AC and S-EES. An example of action towards the AC may be to inform AC of the upcoming service termination so the AC and S-EAS can prepare accordingly. An example of action towards the S-EES may be to trigger a new EAS Relocation Request in an attempt to re-instantiate the service again. When this occurs, it may be up to the WTRU to decide if the new PDU session should be established or not. If the WTRU chooses to establish the new PDU session anyways, it may continue to use the S-EAS for as long as the PDU Session Address Lifetime allows and, additionally, the S-EES may know that the context transfer should not be performed since the T-EAS was not successfully instantiated.

In some solutions, the 5GC-AMF may send a PDU Session Modification command to the WTRU causing the WTRU to answer with an acknowledgment 756a. The WTRU may then initiate a PDU Session Establishment Request 756b as outlined which may result in a PDU Session Initialization at the 5GC.

In some solutions, as part of the PDU session initialization, the S-EES may receive a Late Notification (Nnef-TrafficInfluence) 757. This Late Notification 757 may indicate to the S-EES that the UP reconfiguration will soon be complete so the UE Context Transfer 758 procedure should be initiated towards the T-EAS. Once the Context Transfer 758 is complete or initiated, the S-EES may respond to the 5GC with a positive Late Notification (Nnef-TrafficInfluence-ApRelocationInfo) 759 message. This may allow the 5GC to complete the UP reconfiguration. In the event where context transfer failed (not shown), a negative Late Notification 759 response may be sent back, which may possibly cancel the network reconfiguration. If the 5GC elects to proceed with the reconfiguration on a negative response, user service may be affected by the EAS where the context was not transferred. Alternatively, or additionally, in the event where context transfer failed (not shown on diagram), the S-EES may decide to continue using the S-EAS and tell the 5GC to maintain the old connection longer. In this case, the Late Notification 759 response may include an indication of the requested period that the connection is needed for. This may trigger the SMF to modify the PDU Session Release timer values, which in turn may be delivered to the WTRU as PDU Session Address Lifetime in protocol configuration options. A PDU Session Address Lifetime update may be used to instruct the WTRU not to release the old PDU Session and may be used by the EEC to act towards the AC and S-EES. An example of action towards the AC may be to inform AC of the upcoming service disruption so the AC and S-EAS can prepare accordingly. An example of action towards the S-EES may be to trigger a new EAS Relocation Request in an attempt to repeat the application relocation procedure again.

In some solutions, the WTRU may receive the PDU Session Establishment Accept 760, which may indicate that the new PDU session is active. In some solutions, the EEC may detect the change in the PDU session and re-select a new T-EES for the new EDN. The EEC may choose to Refresh a List of EES Lists 761a before the EEC chooses a T-EES 761b. In some solutions, once the T-EES is selected, the T-EAS discovery may be performed and the EEC may send a discovery request 762a for the given EAS. The T-EES, using the WTRU identifier and the EAS identifier, may retrieve the T-EAS information 762b stored in the Register 754c and provides the EEC with the endpoint address of the T-EAS. In some solutions, the EEC may use the T-EAS endpoint information to allow the AC to connect to the T-EAS. There may be several options for the EEC to inform the AC about the T-EAS change. In some options, the EEC may set local IP routing rules in the WTRU kernel to redirect traffic towards the T-EAS endpoint address. In some options, the EEC may invalidate/update the DNS cache entry so that when the connection breaks the AC performs a DNS request and obtains the T-EAS endpoint address. In some options, the EEC may have a dedicated API to inform the AC of the endpoint address change (edge aware AC).

Embodiments directed to EAS relocation procedures triggered by the WTRU are described herein. Such embodiments may include: a modified procedure according to one or more of the embodiments described above; an EEC to EES-EAS Relocation Request; or an EES to EEC-EAS Relocation Response.

Figure 8:
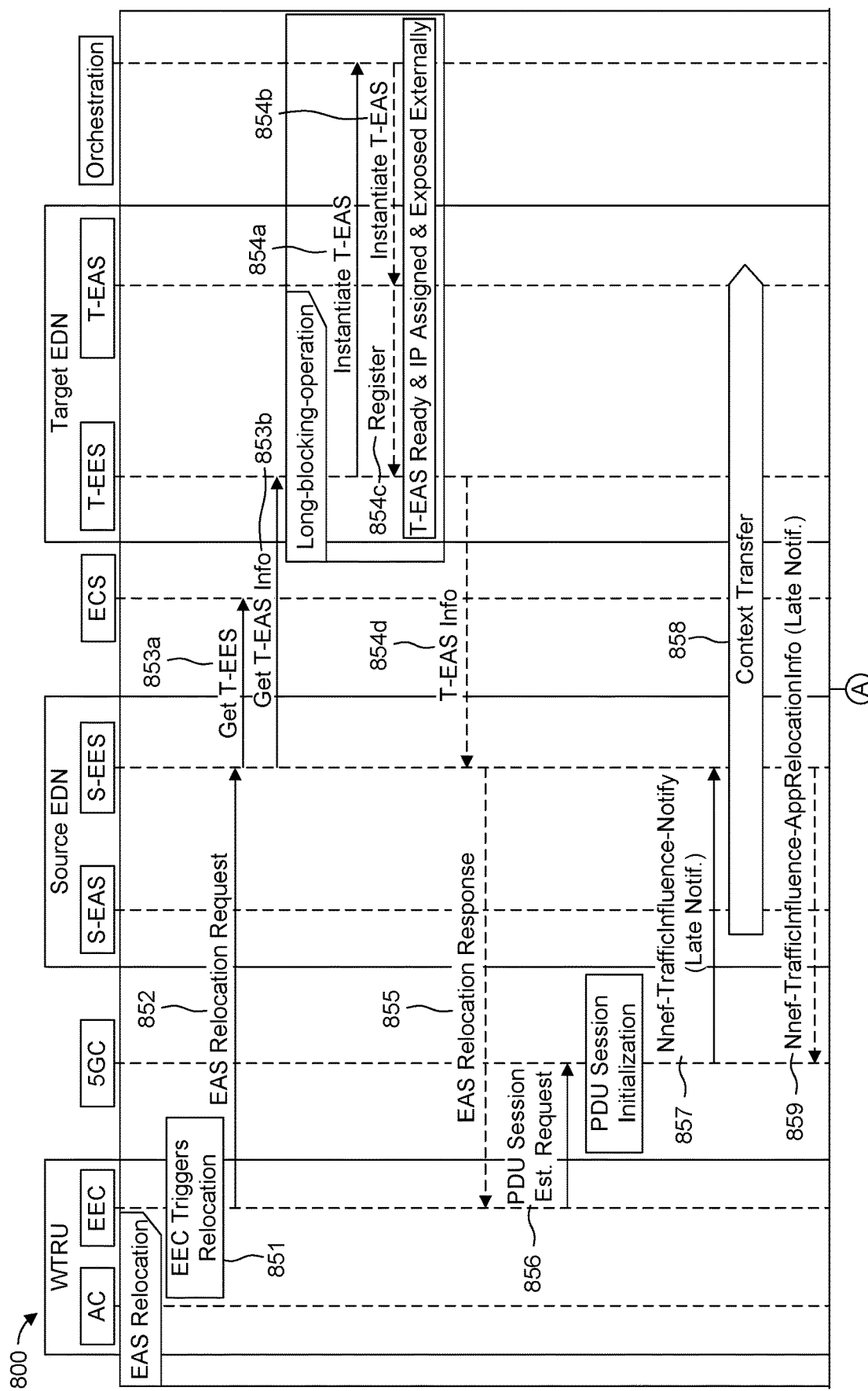
FIG. 8 illustrates an example procedure for EEC triggered EAS relocation.
Figure 8:
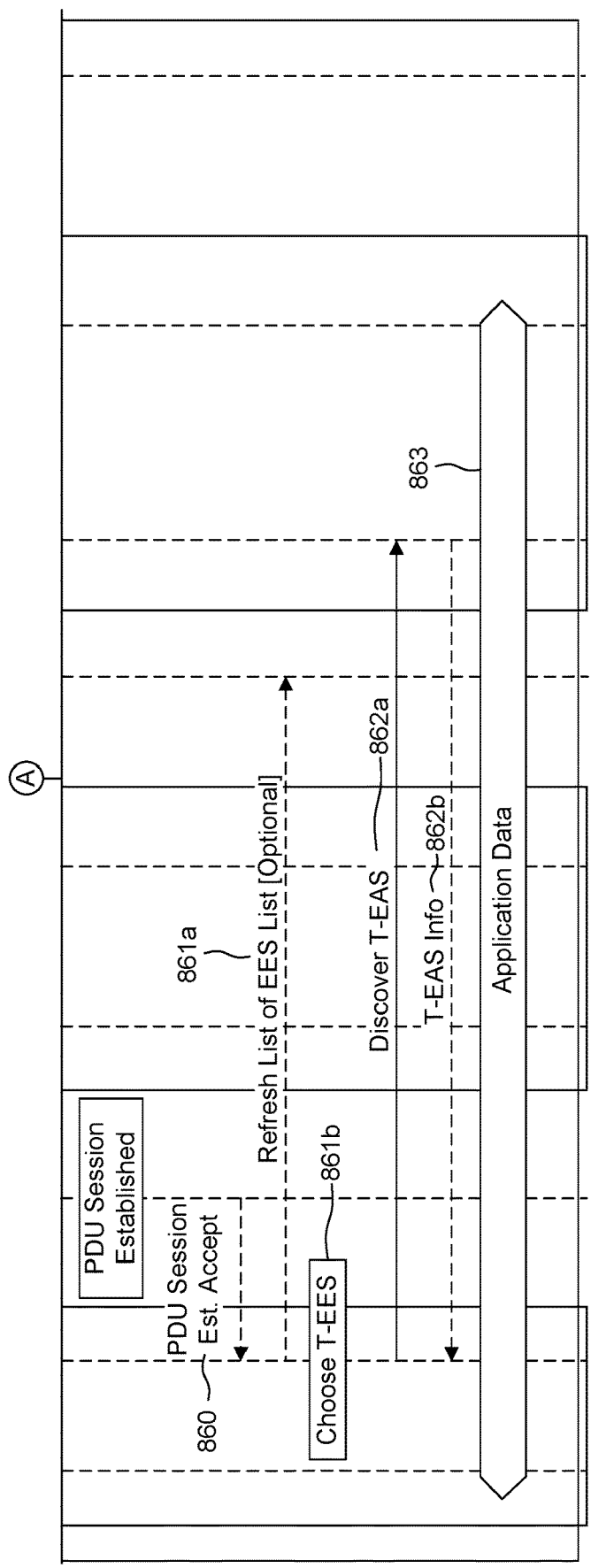

FIG. 8 illustrates an example procedure for EEC triggered EAS relocation 800. The prerequisites may be the same or similar to those introduced and described above with respect to FIG. 6. In some solutions, the procedure may start when the EEC triggers relocation 851 of the EAS. The reason for the EAS relocation may be specific to the EEC implementation but may be related to bad KPIs with the current EAS, retry of a failed EAS relocation attempt, indication from the AC that it desires relocation, optimization of resources, or other factors. A decision by the EEC to relocate an EAS may impact network configuration. For example, it may require establishment of a new PDU session. When such relocation requires connectivity to a new EDN, the EAS may not be available at the target EDN, so coordination may be required between edge and the 5GC.

In one embodiment, the procedure may begin with the EEC sending an EAS relocation request 852 to the S-EES. The request may contain the EAS or a list of EAS(es) and a UE identifier. In some embodiments the S-EES will Receive T-EES information 853a and Receive T-EAS information 853b. In some scenarios, there may be no T-EAS to serve the WTRU. However, if a T-EAS was available, interactions with the orchestrator may not be needed since they may have occurred in the past and the rest of the procedure applies. The T-EES may instantiate the T-EAS 854a by interacting with the orchestration layer, or function, in a network node. Depending on EAS complexity, EAS required hardware resources and the orchestration layer in general, the instantiation of the T-EAS 854b may take several seconds or even minutes before the T-EAS is ready to operate, has assigned an IP address, and has an externally reachable endpoint configured. Once the T-EAS is ready and externally reachable, the T-EAS register to the T-EES 854c which may cache locally the T-EAS that has been instantiated 854a for that specific UE. It may be important that the T-EAS registration 854c contains a reference to the originating WTRU so that it is not consumed by another WTRU. Finally, the T-EAS endpoint address may be relayed back to the S-EES 854d which may provide the information to the S-EAS (not shown).

In some embodiments, on reception of T-EAS information 853b, the S-EES may send the EAS relocation response 855 to the EEC, indicating that the T-EAS are ready to serve the AC. The EEC response may include the T-EES address as well as T-EAS endpoint addresses. Including this information may prevent unnecessary discovery transactions after the PDU Session Est. Request 856. In some embodiments as shown in FIG. 8, 856-860 may be performed the same or similarly as described above with respect to 756a-760.

In some solutions Refreshing the list of EES lists 861a may be avoided if information was provided by the S-EAS during the EAS Relocation Response 855. If information was not provided then EEC will Refresh the List of EES lists 861a and the EEC will Choose T-EES 861b. In some solutions, Discovery of T_EAS 862a and sending of T-EAS information 862b from the T-EES to the EEC may be avoided. If the information was not provided, then the EEC may Discover T-EAS 862a and the T-EES will send T-EAS information 862b back to the EEC.

Described herein are embodiments directed to EAS relocation procedure triggered by the EAS/EES. Such embodiments may include one or more aspects of modified procedures described above and/or an EES to EEC-EAS Relocation Command.

Figure 9:
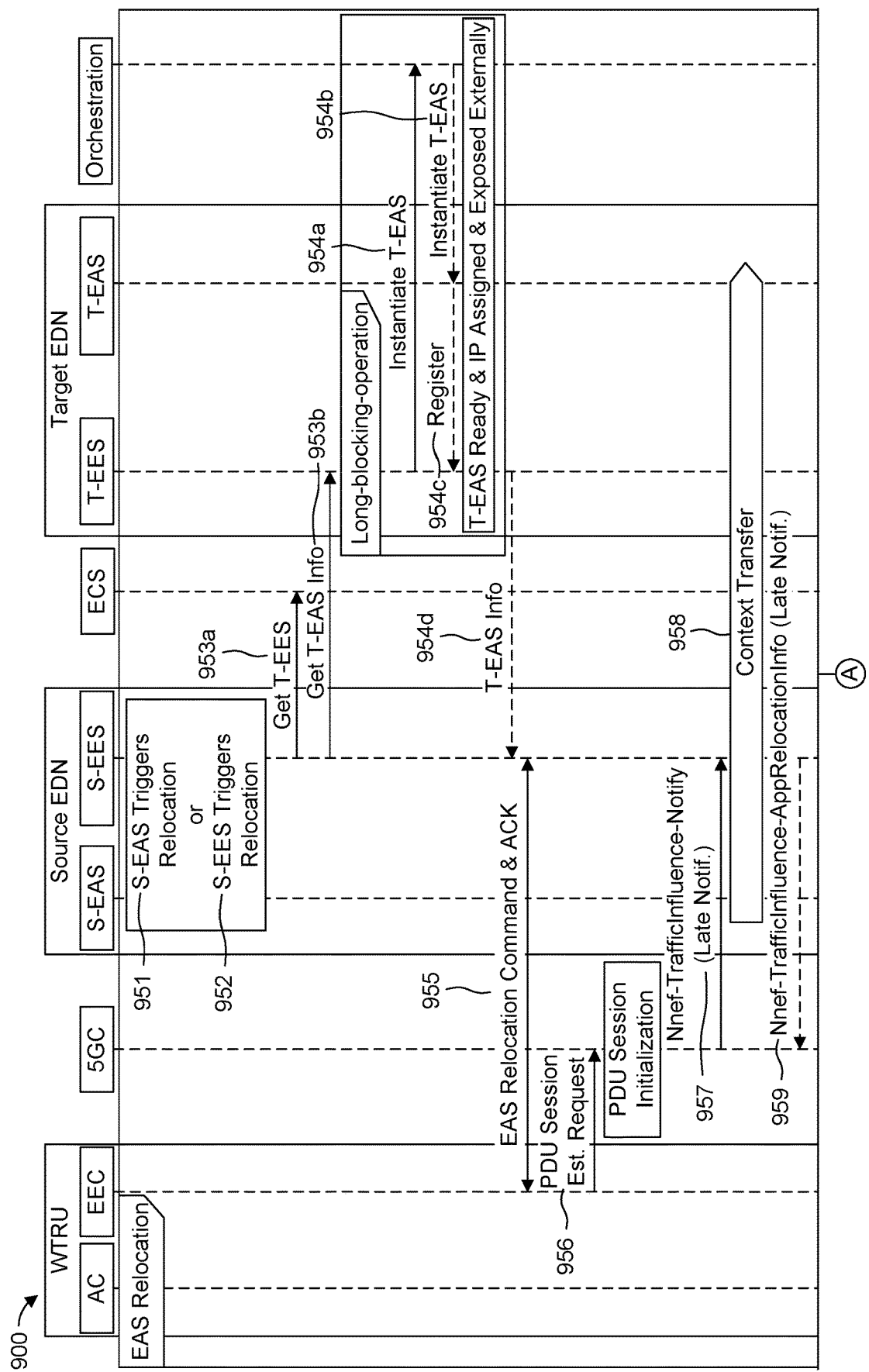
FIG. 9 illustrates an example procedure for EAS/EES-triggered EAS relocation.
Figure 9:
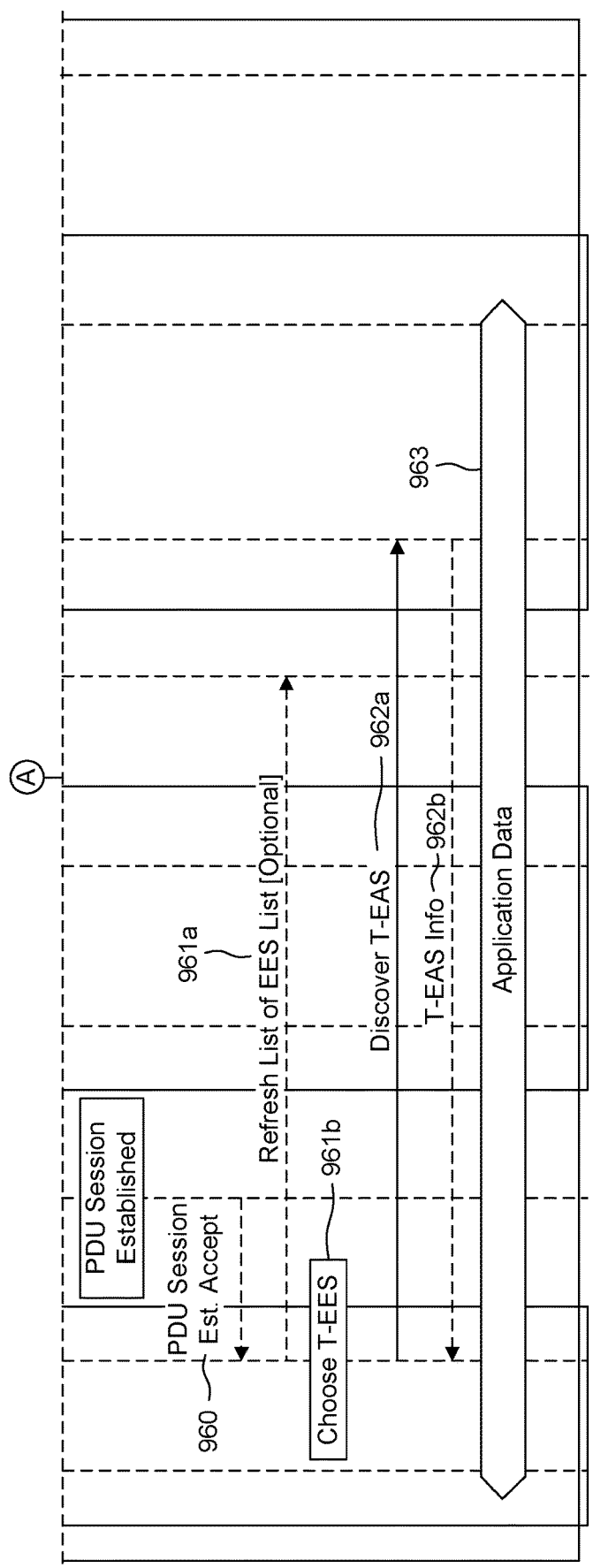

FIG. 9 illustrates an example procedure for S-EAS or S-EES triggered EAS relocation 900. The prerequisites may be the same or similar to those introduced and described above with respect to FIG. 6. In some solutions, the procedure may start when the S-EAS triggers relocation 951 of the EAS. Alternatively or additionally, the procedure may start when the S-EES triggers relocation 952 of one or more S-EAS(es). The S-EES may then receive T-EES information 953a from the ECS and the receive T-EAS information 953b from the T-EES.

The S-EES may issue an EES-Change-Notify to the EEC providing early information such as an EES profile and or information about the upcoming T-EES change. This may provide advantages to the EEC in preparing for the upcoming change or avoiding re-discovery of the T-EES and may improve T-EAS transition As previously described above.

In some scenarios, there may be no T-EAS to serve the UE. However, if a T-EAS was available, interactions with the orchestrator may not be needed since they may have occurred in the past and the rest of the procedure applies. The T-EES may instantiate the T-EAS 954a by interacting with the orchestration layer, or function, in a network node. Depending on EAS complexity, EAS required hardware resources and the orchestration layer in general, the instantiation of the T-EAS 954a may take several seconds or even minutes before the T-EAS is ready to operate, has assigned an IP address, and has an externally reachable endpoint configured. Once the T-EAS is ready and externally reachable, the T-EAS register to the T-EES 954c which may cache locally the T-EAS that has been instantiated 954b for that specific UE. It may be important that the T-EAS registration 954c contains a reference to the originating UE so that it is not consumed by another UE. Finally, the T-EAS 954d information may be sent back to the S-EES from the T-EES.

On reception of T-EAS information 954d, the S-EES may send the EAS Relocation Command 955 to the EEC, indicating that the T-EAS(es) are ready to serve the AC. The EEC response may include the T-EES address as well as T-EAS(es) endpoint address(es). Including this information may prevent unnecessary discovery transactions after the new PDU session is established. After the EEC response is sent back to the S-EES, the EEC may send a PDU Session Est. Request 956 to the 5GC to initiate the PDU Session Initialization.

As an example, on reception of EAS Relocation Command 955, the WRTU may perform one or more of the following actions: use the T-EAS information present in the EAS-Relocation-Command message to establish connectivity to the T-EES; look up in its internal EES/EAS cache to find T-EES/T-EAS connectivity information; query an ECS using service provisioning procedures to discover connectivity information to the T-EES; communicate with the T-EES to discover connectivity information to the T-EAS; establish a PDU session towards the T-EES/T-EAS data network; inform the Application Client located on the WRTU via EDGE-5 reference point or using other means to suspend communications with the S-EAS while the application context relocation is ongoing or alternatively inform the Application Client that the T-EAS connectivity can be established if the context transfer has completed.

In some solutions, the 5GC-AMF may send a PDU Session Modification command to the UE causing the UE to answer with an acknowledgment 756a. The UE may then initiate a PDU Session Establishment Request 756b as outlined which may result in a PDU Session Initialization at the 5GC. In some solutions, as part of the PDU session initialization, the S-EES may receive a Late Notification (Nnef-TrafficInfluence) 957. This Late Notification 957 may indicate to the S-EES that the UP reconfiguration will soon be complete so the UE Context Transfer 958 procedure should be initiated towards the T-EAS. Once the Context Transfer 958 is complete or initiated, the S-EES may respond to the 5GC with a positive Late Notification (Nnef-TrafficInfluence-ApRelocationInfo) 959 message. This may allow the 5GC to complete the UP reconfiguration. In the event where context transfer failed (not shown), a negative Late Notification 959 response may be sent back, which may possibly cancel the network reconfiguration. If the 5GC elects to proceed with the reconfiguration on a negative response, user service may be affected by the EAS where the context was not transferred. Alternatively, or additionally, in the event where context transfer failed (not shown on diagram), the S-EES may decide to continue using the S-EAS and tell the 5GC to maintain the old connection longer. In this case, the Late Notification 959 response may include an indication of the requested period that the connection is needed for. This may trigger the SMF to modify the PDU Session Release timer values, which in turn may be delivered to the WTRU as PDU Session Address Lifetime in protocol configuration options. A PDU Session Address Lifetime update may be used to instruct the WTRU not to release the old PDU Session and may be used by the EEC to act towards the AC and S-EES. An example of action towards the AC may be to inform AC of the upcoming service disruption so the AC and S-EAS can prepare accordingly. An example of action towards the S-EES may be to trigger a new EAS Relocation Request in an attempt to repeat the application relocation procedure again.

In some solutions, the WTRU may receive the PDU Session Establishment Accept 960, which may indicate that the new PDU session is active. In some solutions, the EEC may detect the change in the PDU session and re-select a new T-EES for the new EDN. The EEC may choose to Refresh a List of EES Lists 961a before the EEC chooses a T-EES 961b. In some solutions, once the T-EES is selected, the T-EAS discovery may be performed and the EEC may send a discovery request 962a for the given EAS. The T-EES, using the WTRU identifier and the EAS identifier, may retrieve the T-EAS information 962b stored in the Register 954c and provides the EEC with the endpoint address of the T-EAS. In some solutions, the EEC may use the T-EAS endpoint information to allow the AC to connect to the T-EAS. There may be several options for the EEC to inform the AC about the T-EAS change. In some options, the EEC may set local IP routing rules in the UE kernel to redirect traffic towards the T-EAS endpoint address. In some options, the EEC may invalidate/update the DNS cache entry so that when the connection breaks the AC performs a DNS request and obtains the T-EAS endpoint address. In some options, the EEC may have a dedicated API to inform the AC of the endpoint address change (edge aware AC).

Alternatively or additionally, the procedure of FIG. 9 may start with the S-EES deciding that one or more S-EAS(es) should be relocated. The reason for the EAS(es) relocation may be related to KPIs, WTRU location, optimization of resources, or one or more other factors.

Described herein are Edge External Parameters for influencing 5GC operation. Such described embodiments may include an Edge External Parameters definition; EES provisioning of Edge External Parameters in UDR; and EAS usage indication.

When network reconfiguration is triggered at the SMF, the SMF reselection decision may not take into account the current UE edge usage nor the edge capabilities at the EDN associated with the reselected network. Providing UE edge usage information and EDN edge capabilities may assist the SMF in performing better SMF/UPF/PSA Anchor reselection decisions.

On the edge side, the EES may be centrally positioned to provide insights on edge usage and capabilities as follows. For example, the EES may maintain a registry of available EASs. The EES may act as an AF towards the 5GC via EDGE-2 reference point. The EAS directly serving the AC on a UE may communicate with the EES over EDGE-3 reference point. On the 5GC side, External Parameter Provisioning may be used to communicate edge usage and capabilities to the 5GC. More specifically, External Parameter Provisioning may allow an AF to store parameters in the UDR via the NEF. These parameters may ultimately be retrieved by a NF (Network Function), such as AMF or SMF, to derive parameters that assist in better network operation. The parameters that may be provisioned as external parameters may include: expected UE behavior parameters; network configuration parameters; 5G VN group data; and/or 5G VN group membership.

Figure 10:
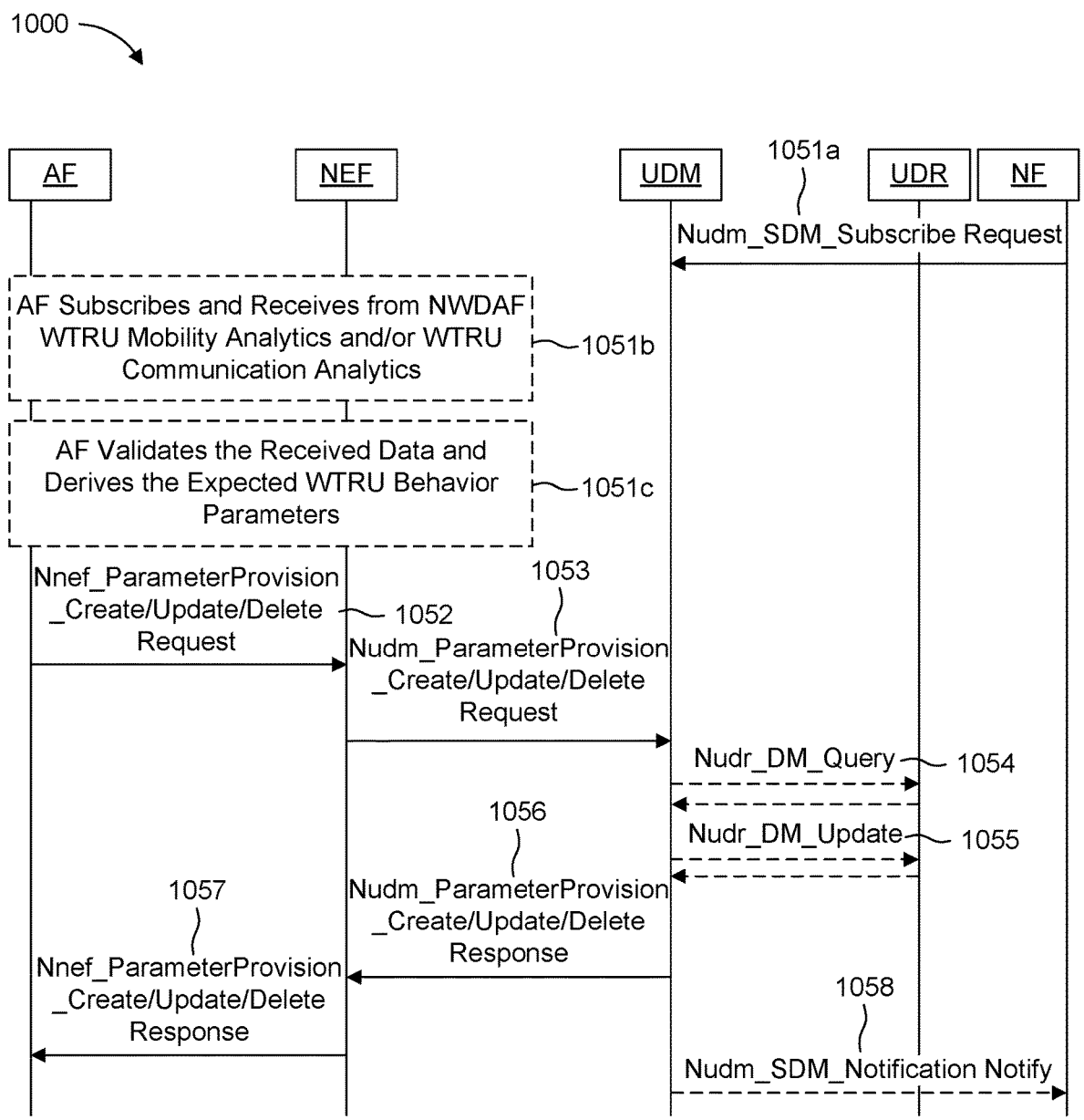
FIG. 10 illustrates an example procedure by which a NF can subscribe to external parameter updates and an AF may provision external parameters.

FIG. 10 illustrates an example procedure by which a NF may subscribe to external parameter updates and an AF may provision external parameters 1000. The AMF and SMF may use such external parameters. In some solutions, the NF may send a Request (Nudm_SDM_Subscribe Request) 1051a to the UDM. The AF may then subscribe and receive from the NWDAF UE Mobility Analytics and/or UE Communication Analytics 1051b. The AF may then validate the received data and derive the Expected WTRU behavior parameters 1051c. The AF may then send an External Parameter Request (Nnef_ParameterProvision_Create/Update/Delete Request) 1052 to the NEF which will send an External Parameter Request (Nudm_ParameterProvision_Create/Epdate/Delete Request) 1053 to the UDM. Once the Request 1053 has been received by the UDM, a Nudr_DM_Query 1054 will be sent back and forth between the UDM and the UDR, followed by a Nudr_DM_Update 1055 being sent back and forth between the UDM and UDR. Once the Nudr_DM_Update 1055 is received by the UDM, an External Parameter Response (Nudm_ParameterProvision_Create/Update/Delete Response) 1056 will be sent from the UDM to the NEF. The NEF may then send an External Parameter Response (Nnef_ParameterProvision_Create/Update/Delete Response) 1057 to the AF which may indicate to the UDM to send a Notification (Nudm_SDM_Notification Notify) 1058 from the UDM to the NF.

In the procedure of FIG. 10, The SMF may associate the received parameters with a PDU session based on the DNN and S-NSSAI received from the UDM. The SMF may influence the network configuration based on the received parameters, for example: configuring the UPF based on parameters such as Scheduled Communication Type or Suggested Number of Downlink Packets or deactivating a User Plane based on parameters such as Communication Duration Time. In some solutions, the SMF may derive CN Assisted RAN Information from the parameters and provide these to the RAN via the AMF. Hence, it may be determine that the EES is centrally located and has some of the edge information; that the EES acts as an AF towards the 5GC; that an AF can store external parameters in the UDR; and/or that the SMF and AMF NFs may use the UDR's external parameters to assist in network configuration.

In embodiments described herein, a new group called Edge External Parameters may be required to define edge usage parameters. This information may be stored per PDU session in the UDR. Edge External Parameters may be a parameter group (like 5G VN) and/or can be integrated in the Expected WTRU Behavior parameters as it defines the WTRU behavior in terms of edge application usage. Table 1 provides a description of three possible Edge External Parameters.

TABLE 1

Edge External Parameters

| Parameter | Description |
| --- | --- |
| DNN (aka EDN) | Data network identifier |
| EAS Descriptor | There may be multiple instances of this; the IE may provide a status of the current EAS usage and may be used by the SMF to assist in SMF/UPF/PSA Anchor re-selection |
| Preferred ECSP (Edge Computing Service Provider) | There may be multiple instances of this; the IE may provide information on preferred ECSP and may be used by the SMF to assist in SMF/UPF/PSA Anchor re-selection |

A DNN may indicate the edge data network associated with the PDU session. The EAS Description may be a list indicating which EAS are being used by the WTRU over a given PDU session. No EAS Descriptor may mean that the WTRU is not using any EAS; the list may increase as the WTRU starts using EASes. Possible EAS Descriptor fields are further described in Table 2. Preferred ECSP may indicate the user preference when multiple ECSP are available in the MNO network. This may guide network reconfiguration at the SMF level when multiple EDNs are available for an area.

The presence of an EAS Descriptor in the UDR may indicate that an EAS is being used by the WTRU. A WTRU not using any EAS may not have any EAS Descriptor and accordingly, an EAS profile may be removed from the UDR when a WTRU stops using an EAS. It may be the EES's responsibility to maintain the UDR's Edge parameters. An EAS Descriptor may be composed of one or several of the fields shown below in Table 2.

TABLE 2

Edge Application Server Description

| Parameter | Description |
| --- | --- |
| EAS ID | Identifying the EAS that is being used |
| EAS Requirements | EAS requirements (ex. CPU, GPU, memory, storage, etc.) |
| EAS Relocation | EAS supports relocation |
| EAS Context Transfer | EAS requires a context transfer |
| EAS Instantiation Time | Maximum Time to instantiate an EAS |

The EAS ID may identify a specific EAS. The EAS Requirements may provide high-level requirements of an EAS. This may guide network reconfiguration at the SMF level when multiple EDNs are available for an area (ex. EDN with GPUs vs EDN without GPUs). EAS Relocation may indicate that an EAS can be relocated. This may guide network reconfiguration behavior at the SMF level. For example, this may indicate to the SMF that it needs to use a longer PDU Session Release timer or use the EAS Instantiation Time if provided. It may also influence the SMF behavior when receiving early notification responses. EAS Context Transfer may indicate that an application needs to transfer context. It may influence the SMF behavior when receiving late notification responses. EAS Instantiation Time may indicate the maximum time an application should require to be instantiated. This may guide the SMF with selection of an appropriate PDU Session Release timer.

Figure 11:
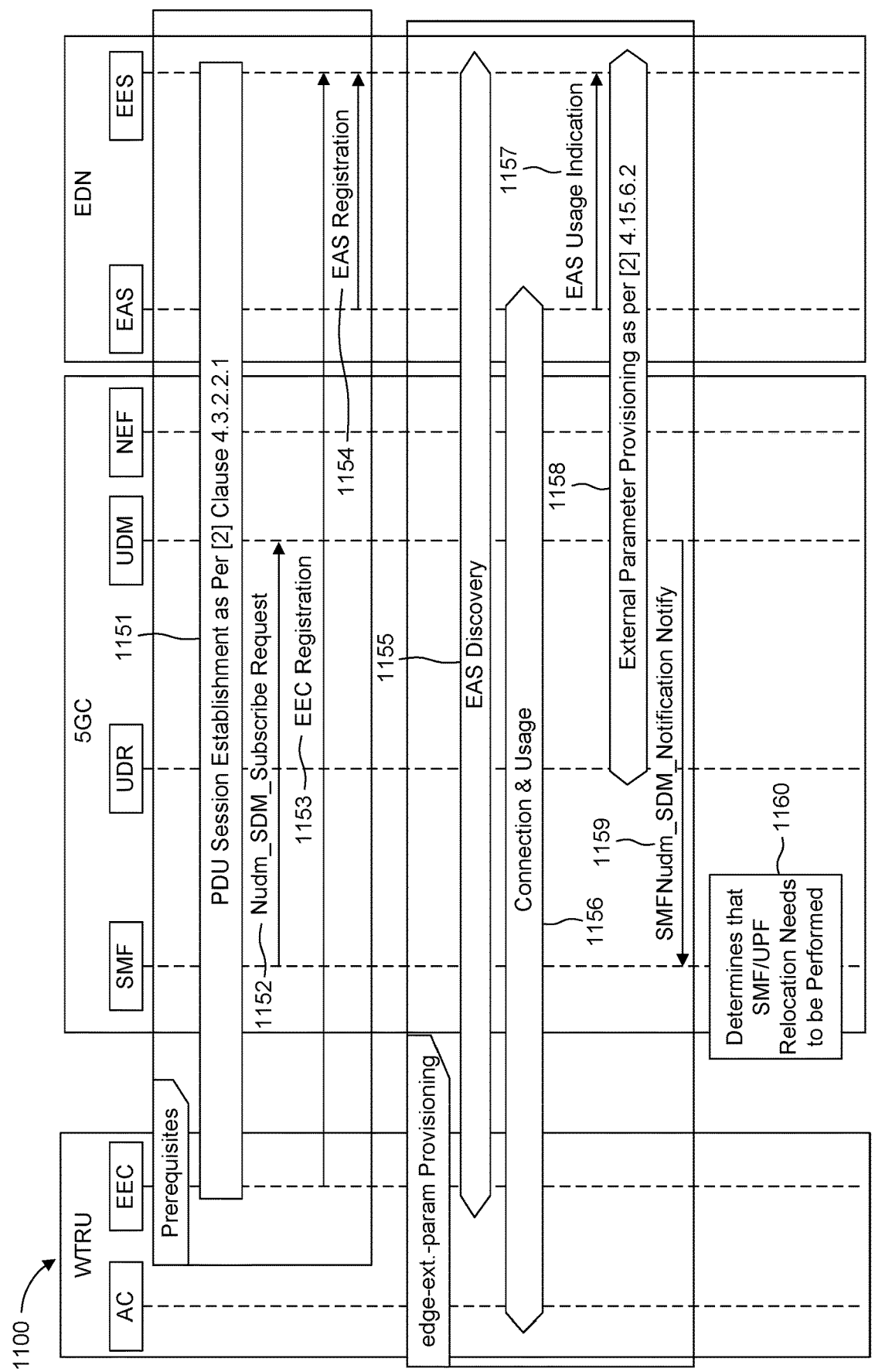
FIG. 11 illustrates an example procedure for Edge External Parameter provisioning.

FIG. 11 illustrates an example of an Edge External Parameter provisioning procedure 1100. The procedure may start with the PDU session establishment to an EDN 1151. The SMF may send a Request (Nudm_SDM_Subscribe Request) 1152 to the UDM. The EEC may register 1153 to the EES and the EAS may register 1154 to the EES. The EEC, with the help of the EES, may initiate EAS Discovery 1155. The AC may initiate Connection and Usage 1156 of the EAS. The EAS may indicate to the EES that the AC has connected by issuing an EAS Connection Indication 1157. The message may contain at least an AC identifier (if available) and/or a UE IP address. The EAS may use information provided by EAS Usage Indication 1157 along with the EEC Registration 1153 information and the EAS Registration 1154 information to form fill Edge External Parameters 1158. When an AC stops using an EAS and disconnects, the EAS may issue an EAS Disconnection Indication allowing the ES to update the Edge External Parameters 1158 accordingly. Edge External Parameters 1158 may be provisioned or updated following one or more procedures. On External Parameters changes, the SMF may receive a Notification (SMFNudm_SDM_Notification Notify) 1159 and perform one or more procedures. The SMF may Determine that SMF/UPF relocation needs to be performed 1160. When SMF needs to relocate SMF/UPF, it may use the provided Edge External Parameters 1158 to assist in selection of a new SMF/UPF/PSA Anchor that allows access to an EDN meeting edge requirements.

Described herein are embodiments directed to EAS relocation procedures performed when triggered by the 5GC using a European Telecommunications Standards Institute (ETSI) M3GPP-1 reference point. Such embodiments may include a modified procedure as described above with a separate orchestration pipeline. An ETSI Multi-access Edge Computing (MEC) Architecture may interwork with 3GPP SA2 and SA6 specifications and may include one or more M3GPP-1 reference points.

Figure 12:
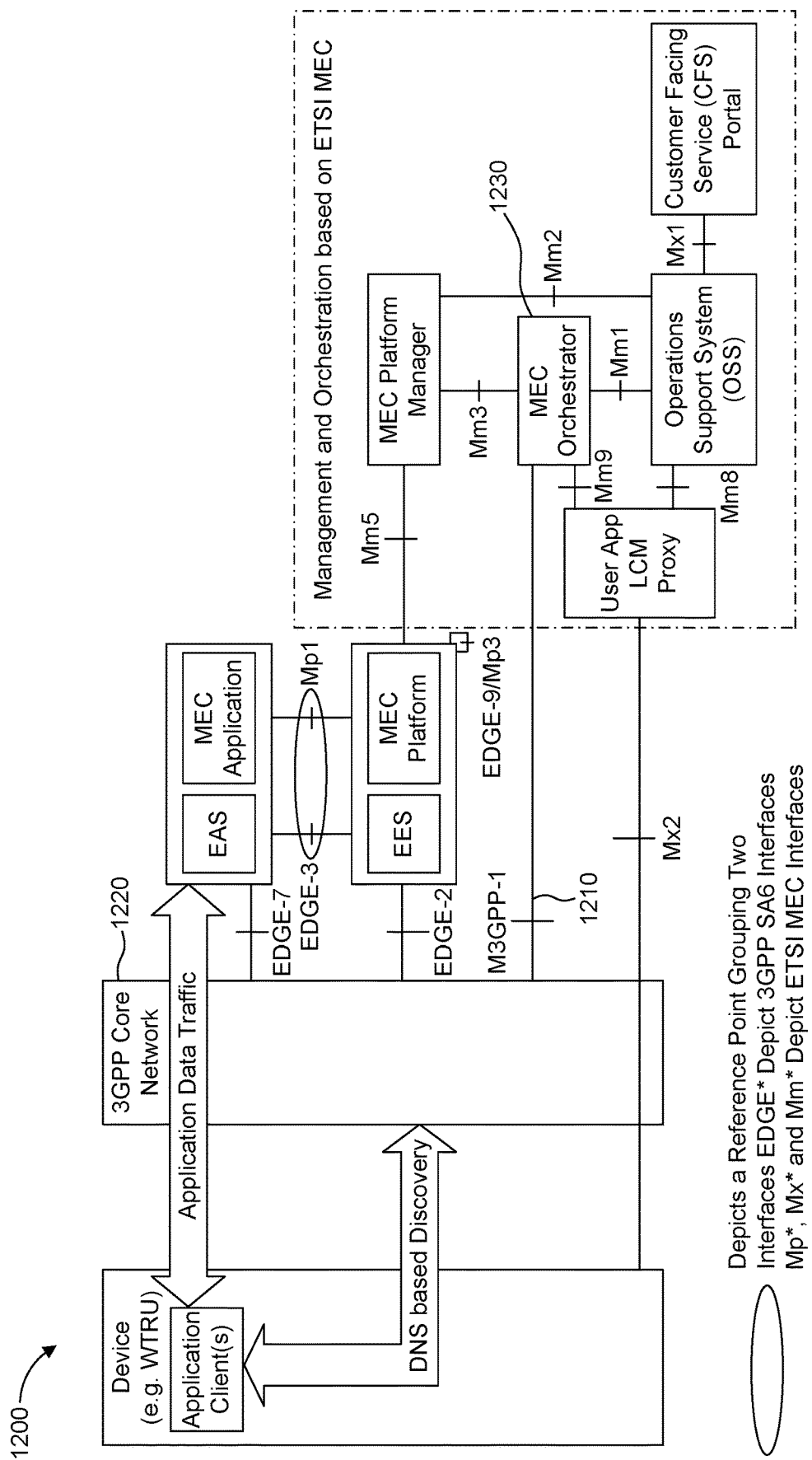
FIG. 12 illustrates an example architecture including a reference point node that may serve as an interface between SA2 NEF/SCEF API and an ETSI MEC Orchestrator.

FIG. 12 is an architectural diagram of a system 1200 that includes a M3GPP-1 reference point 1210 configured to serve as an interface between SA2 NEF/SCEF API 1220 and the ETSI MEC Orchestrator 1230 as shown in FIG. 12. As shown, the MEO (MEC Orchestrator) may register to the UP path management to be notified of new EAS instantiation requirements.

Figure 13:
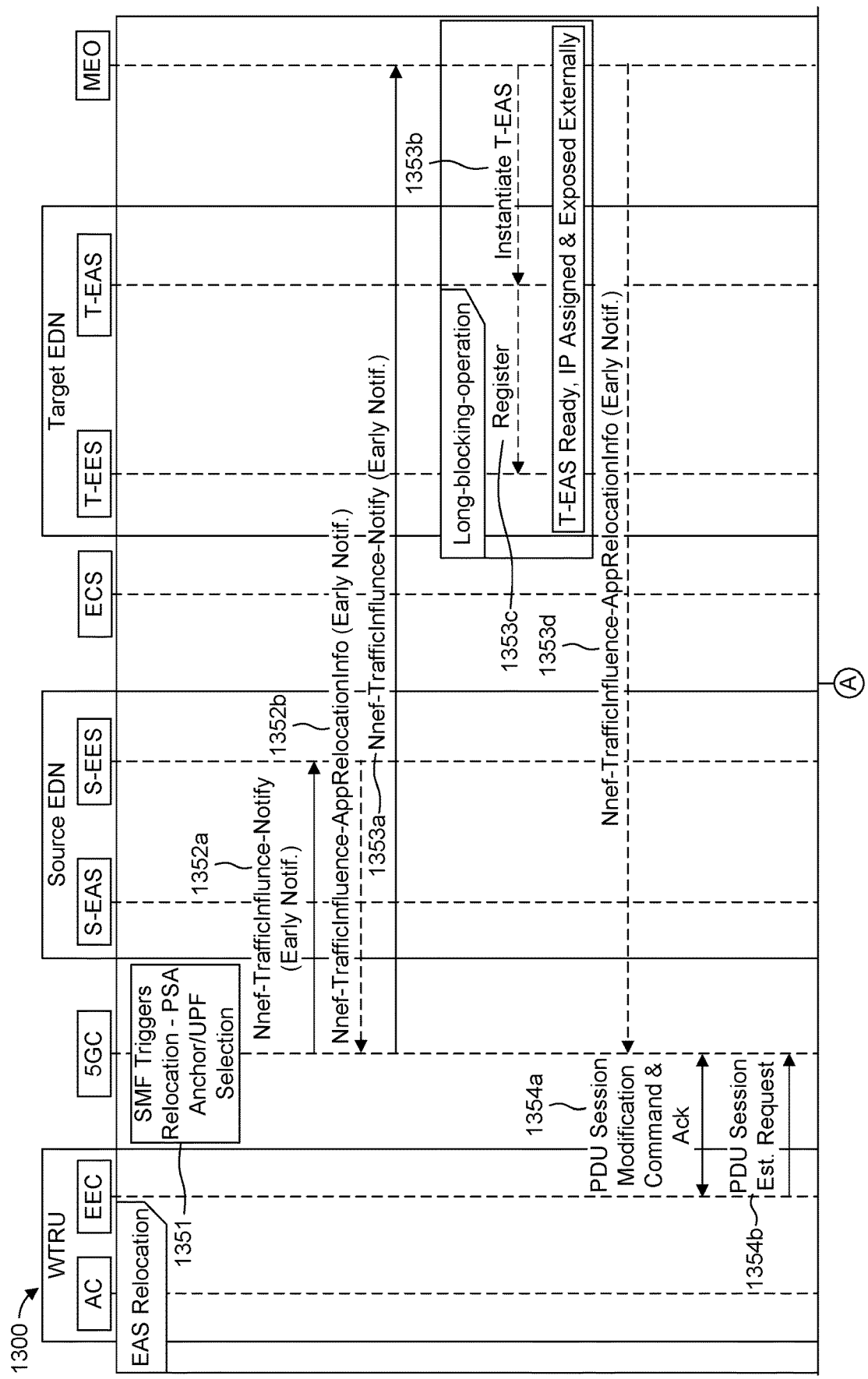
FIG. 13 illustrates an example procedure similar to that in FIG. 6 as applied to a possible deployment using an M3GPP-1 reference point.
Figure 13:
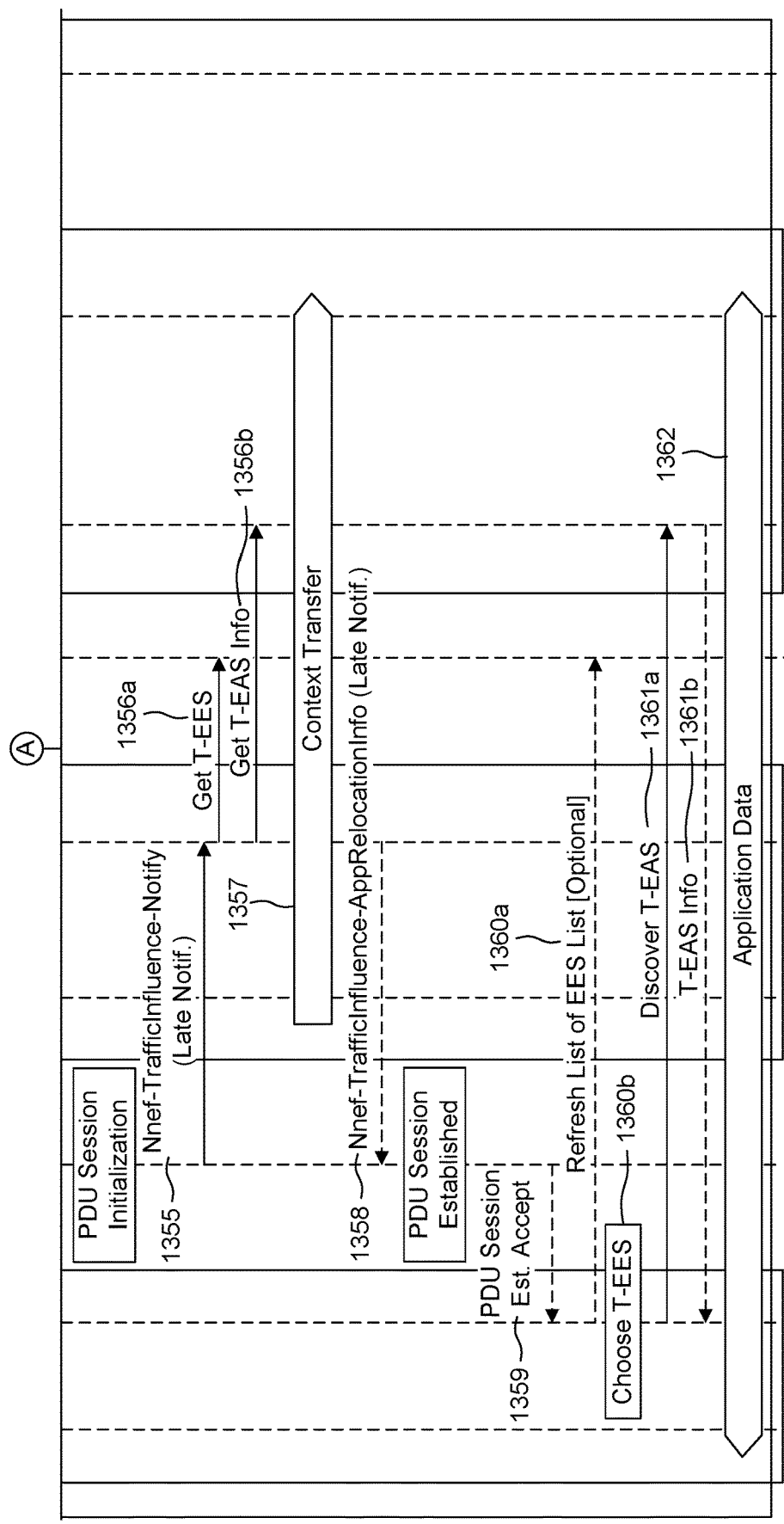

FIG. 13 illustrates an example for 5GC triggered EAS relocation 1300. Prerequisites to this procedure may be the same as outlined in FIG. 6. In some solutions, the MEO may also register to UP Management events (not shown in FIG. 6). In some embodiments the SMF triggers Relocation-PSA Anchor/UPF Selection 1351 which may be performed the same or similarly as described by step 751 of FIG. 7. The S-EES/S-EAS, may register as an AF to the 5GC UP management notifications for a given WTRU. As a result, the S-EES may receive an Early Notification (Nnef-TrafficInfluence-Notify) 1352a indicating UP changes are going to occur. In this deployment type, the S-EES may not have to initiate any action to trigger orchestration since orchestrator has UP management capabilities. The S-EES may send an Early Notification (Nnef-TrafficInfluence-AppRelocation Info) 1352b back to the 5GC.

In some solutions, the MEO may receive an Early Notification (Nnef-TrafficInfluence-Notify) 1353a from the 5GC, indicating UP changes are going to happen. The MEO may instantiate the T-EAS 1353b associated with the WTRU. The TEAS may in turn Register 1353c to the T-EES upon startup. The MEO may learn about the T-EASes associated with a WTRU from the MEC Platform (Mm3/Mm5 interfaces). Alternatively or additionally, the MEO may learn about the required T-EASes via the 5GC, which may provide the list of T-EASes obtained from Edge External Parameters. In some solutions, the MEO may instantiate the T-EAS 1353b via the Mm3/Mm5 interfaces. The T-EAS may Register 1353c to T-EESs as they become ready. Finally, the MEO acting as an AF may have completed the instantiation of the T-EAS 1353b and may send back a positive Early Notification (Nnef-TrafficInfluence-AppRelocationInfo) 1353d response to the 5GC so that network reconfiguration resumes.

Once all AFS have sent a positive response, the 5GC may send a PDU Session Modification Command 1354a to the EEC which will send an acknowledgement back to the 5GC. The EEC may send a PDU Session Est. Request 1354b request to the 5GC to start PDU Session Initialization. A Late Notification (Nnef-TrafficInfluence-Notify) 1355 may be sent from the 5GC to the S-EES. Since the S-EES could not cache any information from the Early Notification 1353d, it has to request the T-EES and T-EAS information at this stage. The S-EES may receive T-EES information 1356a from the ECS and receive T-EAS information 1356b from the T-EES. The Late Notification 1355 may indicate to the S-EES that the UP reconfiguration will soon be complete so the UE Context Transfer 1357 procedure should be initiated towards the T-EAS. Once the Context Transfer 1357 is complete or initiated, the S-EES may respond to the 5GC with a positive Late Notification (Nnef-TrafficInfluence-AppRelocationInfo) 1358 message. This may allow the 5GC to complete the UP reconfiguration. The Late Notification 1358 indicates to the 5GC that the PDU Session is Established, which may send a PDU Session Est. Accept 1359 from the 5GC to the EEC. The EEC will may then Refresh the list of EES lists 1360a before the EEC chooses a T-EES 1360. In some solutions, once the T-EES is selected, the T-EAS discovery may be performed and the EEC may send a discovery request 1361a for the given EAS. The T-EES, using the UE identifier and the EAS identifier, may retrieve the T-EAS information 1361b stored in the Register 1353c and provides the EEC with the endpoint address of the T-EAS. The Application data 1362 may then be sent to the WTRU from the target EDN.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit receive unit (WTRU) for transferring a communication session between a source edge data network (EDN), including a source edge application server (EAS) and a source edge enabler server (EES), and a target EDN including a target EAS and a target EES, the method comprising:
communicating over a first connection, using a first protocol data unit (PDU) session, with the source EDN;
receiving notification information at the WTRU indicating: an upcoming EAS relocation, a target EES profile, and a target EAS profile, wherein the notification information includes a notification to establish a connection to the target EDN;
receiving an indication of a time period to maintain the first connection with the source EDN;
obtaining connectivity information for the target EDN using the target EES profile and the target EAS profile;
initiating a transfer of the communication session to the target EAS using the connectivity information to establish a second connection, using a second PDU session, with the target EDN; and maintaining the first connection with the source EDN at least until the second connection is established or until expiration of the time period.

2. The method of claim 1 wherein the notification information is triggered by at least one of a user mobility, resource optimization requirement, key performance indicator (KPI), or a failed relocation attempt.

3. The method of claim 1 wherein the notification information is a Change notify message.

4. The method of claim 1 wherein the notification information is an early edge relocation message.

5. The method of claim 1 further comprising registering with the target EES prior to initiating the transfer of the communication session.

6. The method of claim 1 wherein obtaining connectivity information includes querying an edge configuration server (ECS) includes using service provisioning procedures to obtain the connectivity information.

7. The method of claim 1, wherein the target EES profile is used to establish the second PDU session with the target EDN.

8. The method of claim 1, wherein the target EAS profile is used to establish an application session with the target EAS.

9. A wireless transmit receive unit (WTRU) configured to transfer a communication session between a source edge data network (EDN), including a source edge application server (EAS) and a source edge enabler server (EES), and a target EDN including a target EAS and a target EES, the WTRU comprising:
a transceiver;
a processor configured to implement an application function;
the transceiver and the processor configured to:
communicate over a first connection, using a first protocol data unit (PDU) session, with the source EDN;
receive notification information at the WTRU indicating: an upcoming EAS relocation, a target EES profile, and a target EAS profile,
wherein the notification information includes a notification to establish a connection to the target EDN;
receive an indication of a time period to maintain the first connection with the source EDN obtain connectivity information for the target EDN using the target EES profile and the target EAS profile;
initiate a transfer of the communication session to the target EAS using the connectivity information to establish a second connection, using a second PDU session, with the target EDN; and
maintain the first connection with the source EDN at least until the second connection is established or until expiration of the time period.

10. The WTRU of claim 9 wherein notification information is triggered by at least one of a user mobility, resource optimization requirement, key performance indicator (KPI), and a failed relocation attempt.

11. The WTRU of claim 9 wherein the notification is a Change notify message.

12. The WTRU of claim 9 wherein the notification is an early edge relocation message.

13. The WTRU of claim 9 wherein the transceiver and the processor are further configured to register with the target EES prior to initiating the transfer of the communication session.

14. The WTRU of claim 9 wherein the transceiver and the processor are configured to obtain the connectivity information by querying an edge configuration server (ECS) using service provisioning procedures.

15. The WTRU of claim 9, wherein the target EES profile is used to establish the second PDU session with the target EDN.

16. The WTRU of claim 9, wherein the target EAS profile is used to establish an application session with the target EAS.

* * * * *